May 13, 1958   H. F. JAMROGOWICZ   2,834,806
MANUFACTURE OF PILE CARPETS
Filed May 4, 1953   12 Sheets-Sheet 1
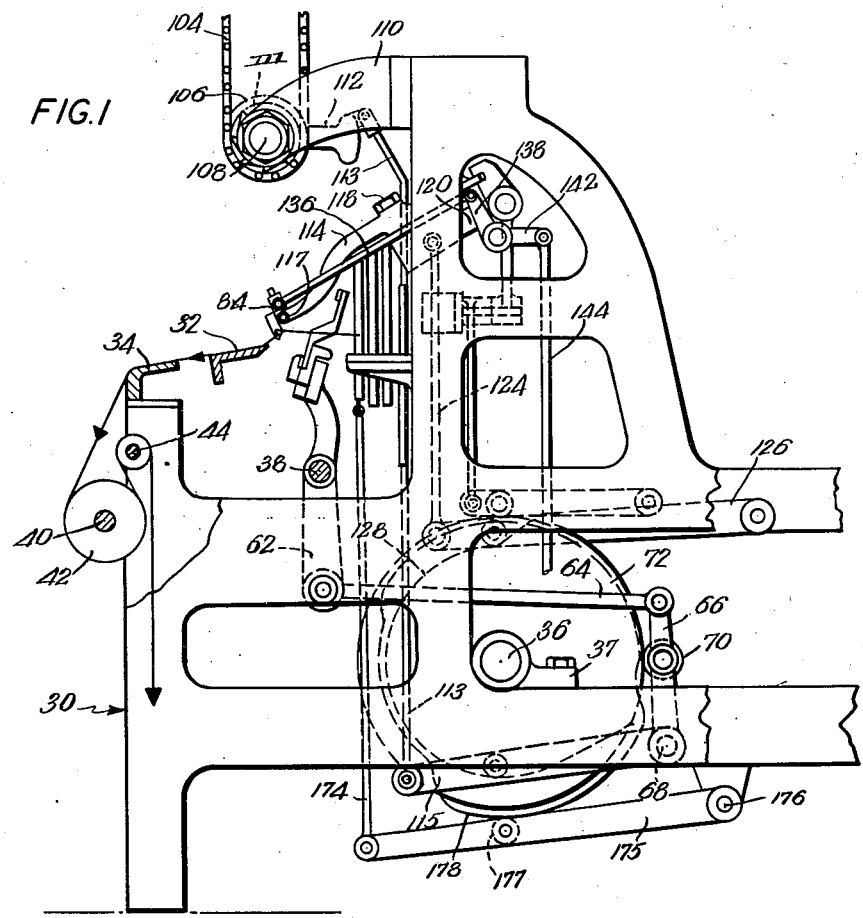
FIG.1
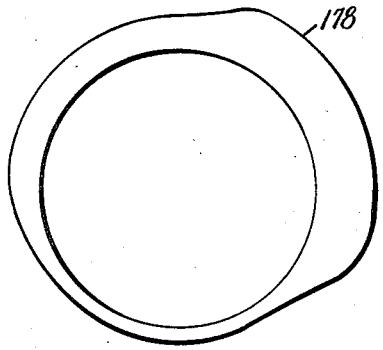
FIG.15
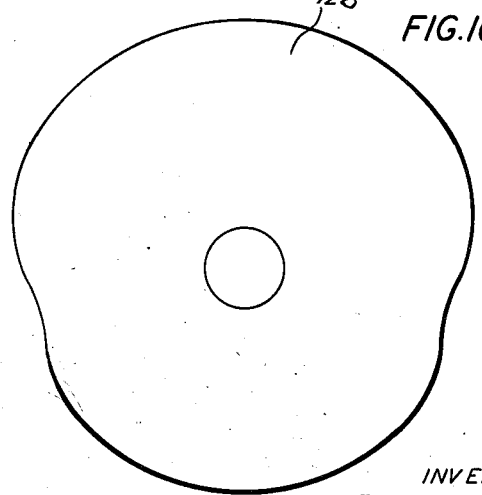
FIG.16
INVENTOR
HARRY F. JAMROGOWICZ,
BY  ATT'Y.

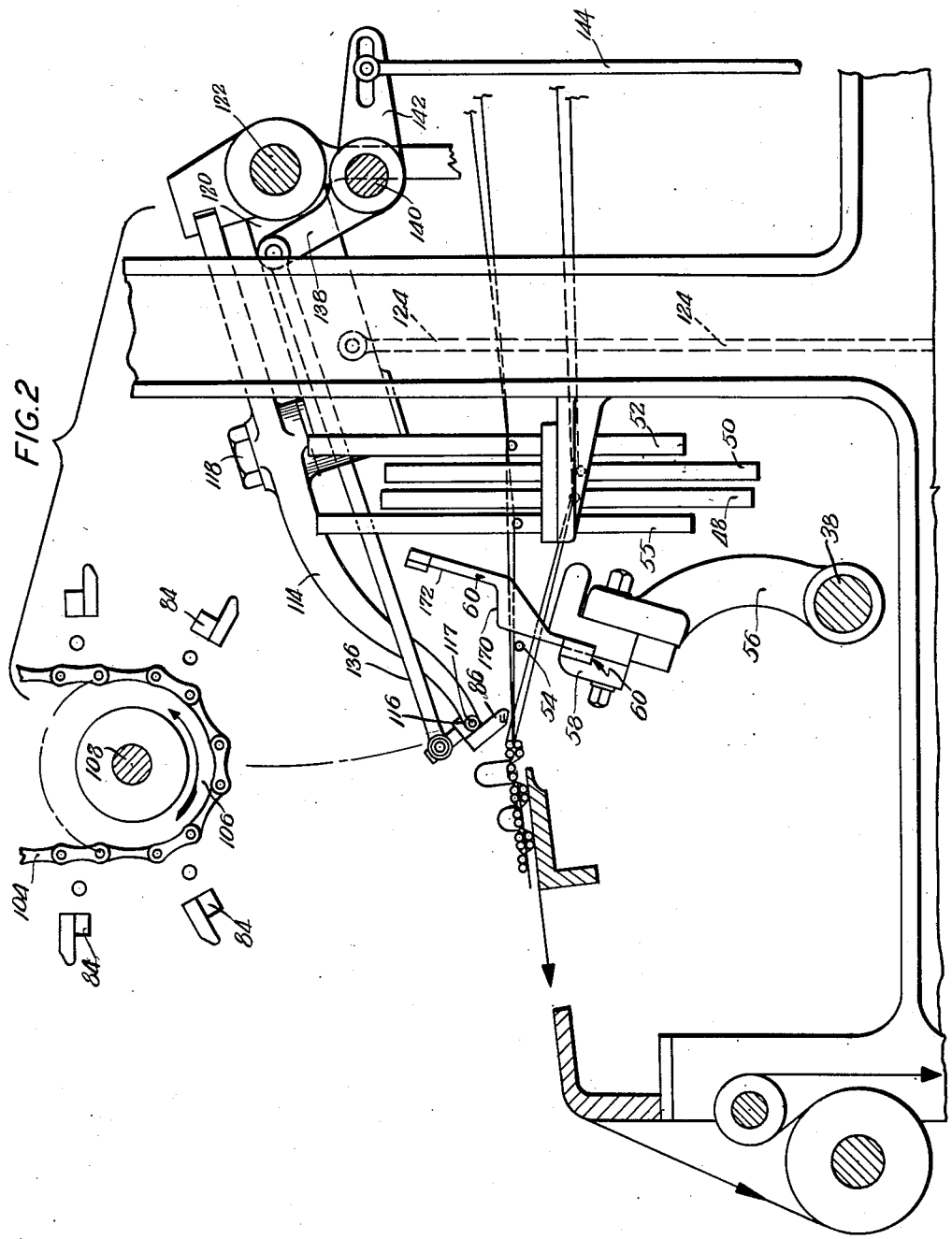

May 13, 1958 H. F. JAMROGOWICZ 2,834,806
MANUFACTURE OF PILE CARPETS
Filed May 4, 1953 12 Sheets-Sheet 3

INVENTOR
HARRY F. JAMROGOWICZ
BY
ATT'Y.

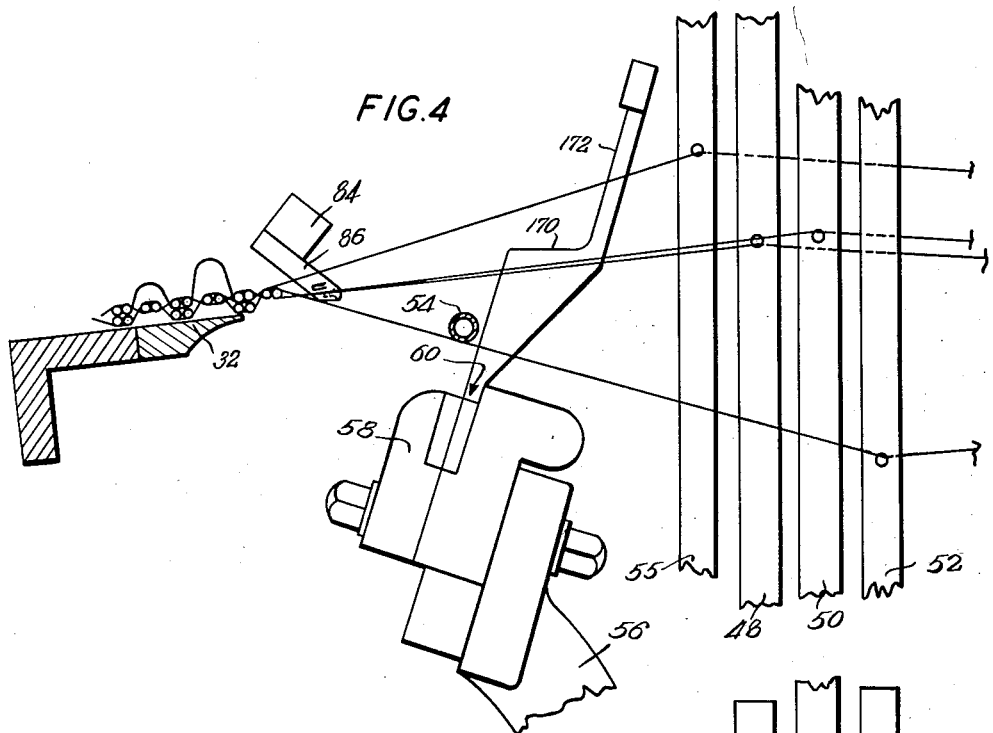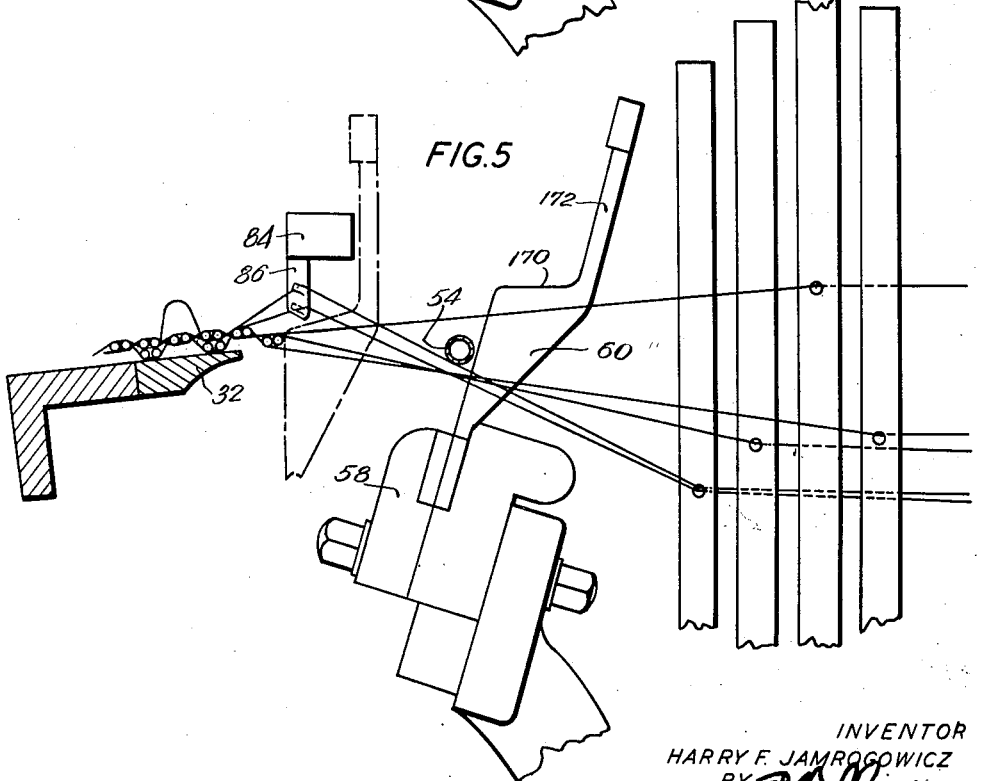

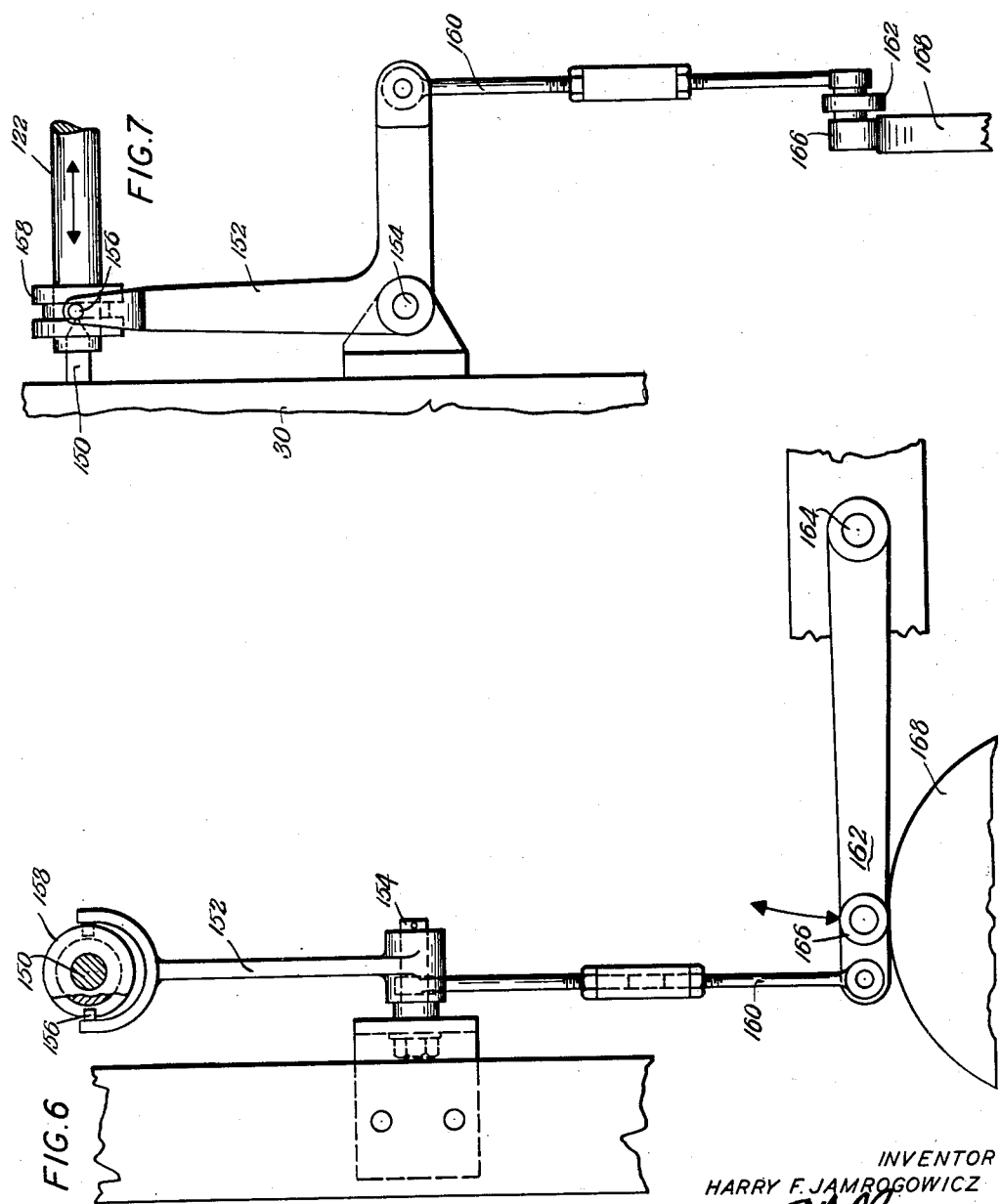

May 13, 1958   H. F. JAMROGOWICZ   2,834,806
MANUFACTURE OF PILE CARPETS
Filed May 4, 1953   12 Sheets-Sheet 6
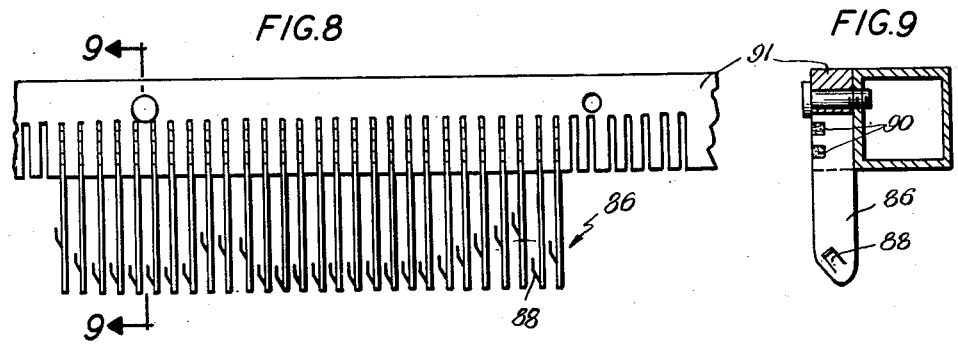
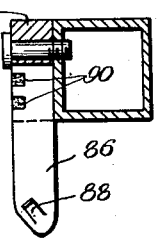
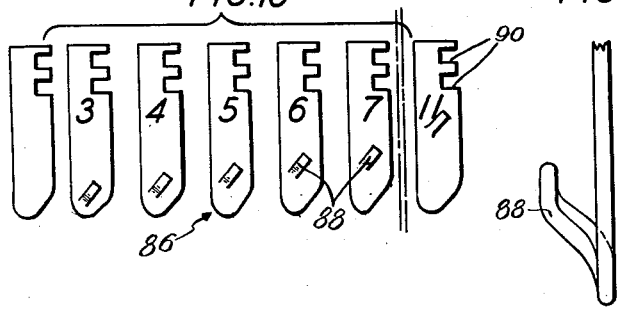
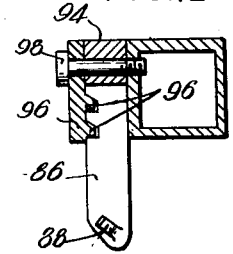
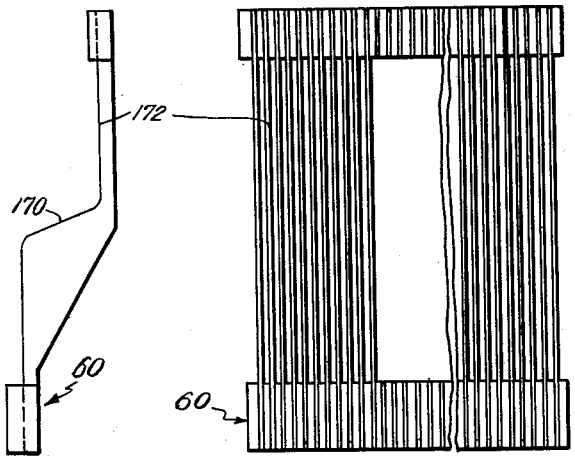
INVENTOR
HARRY F. JAMROGOWICZ
BY
ATT'Y.

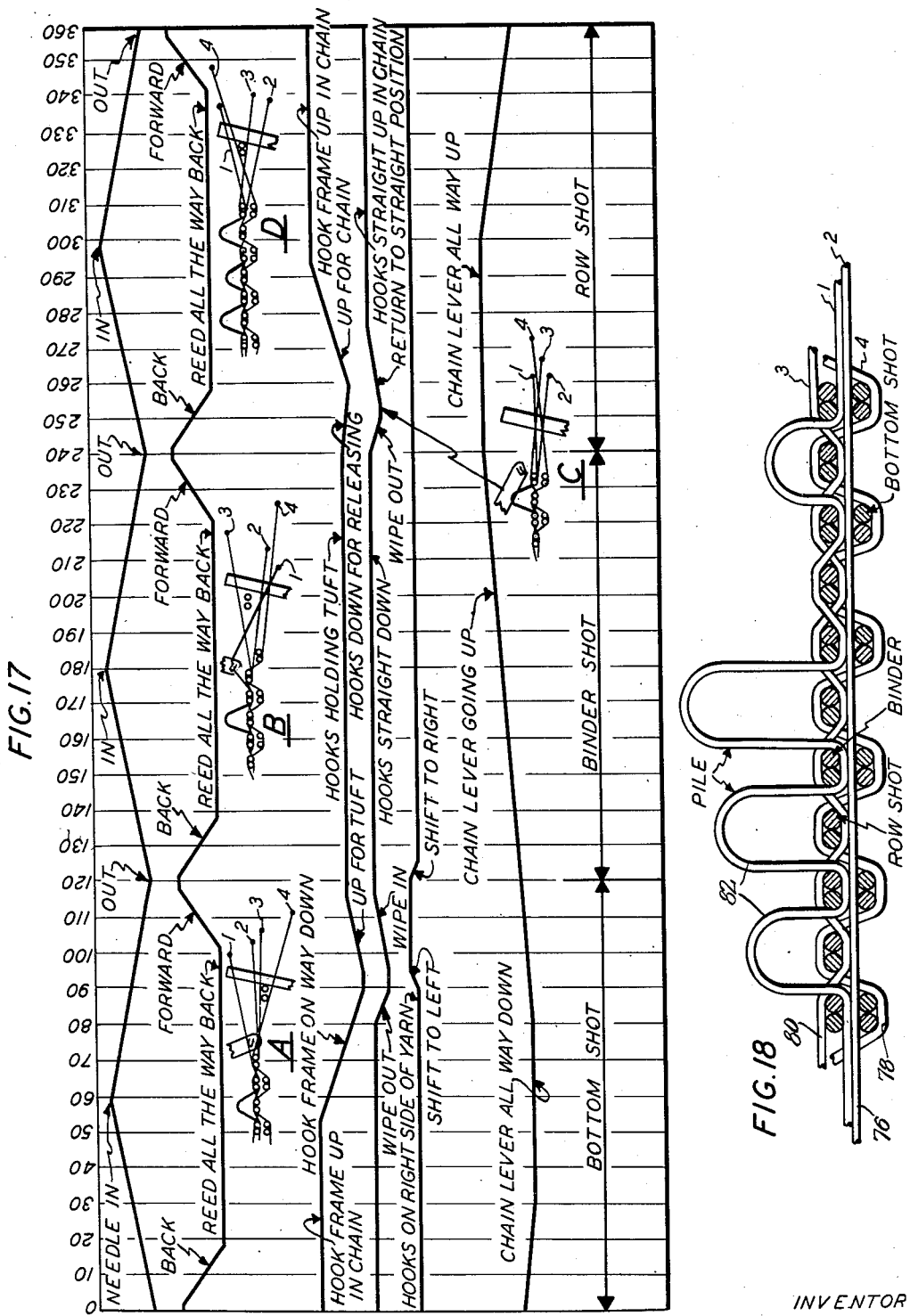

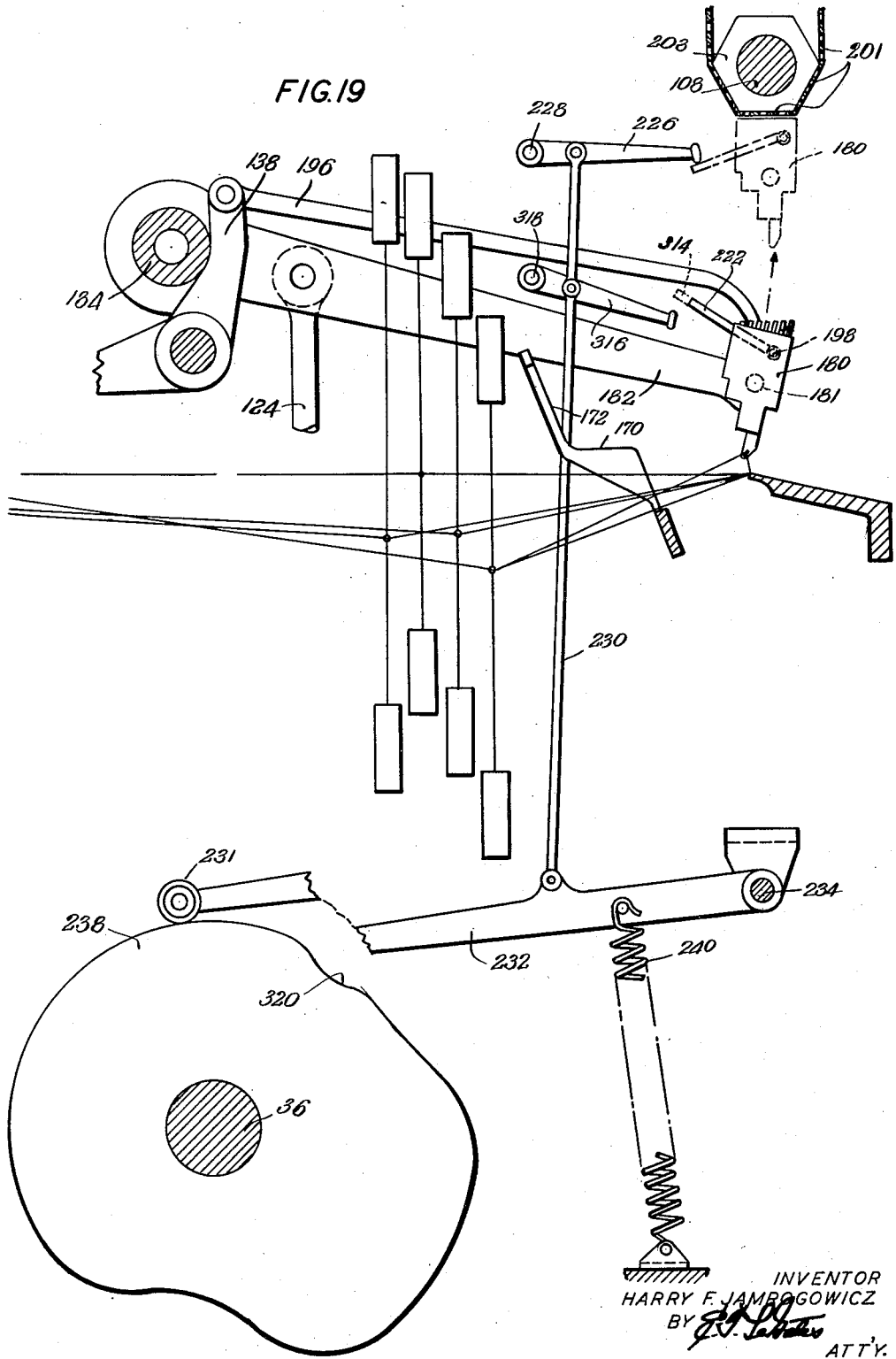

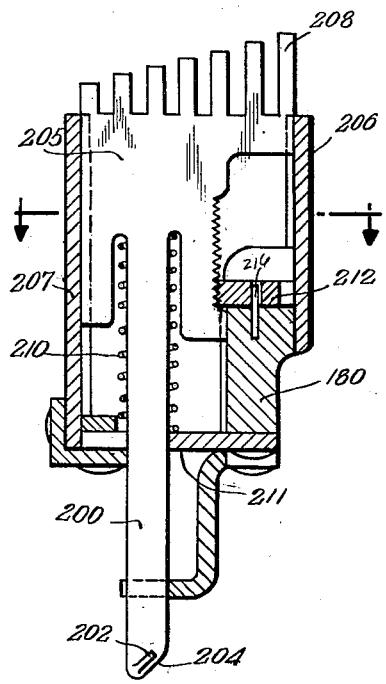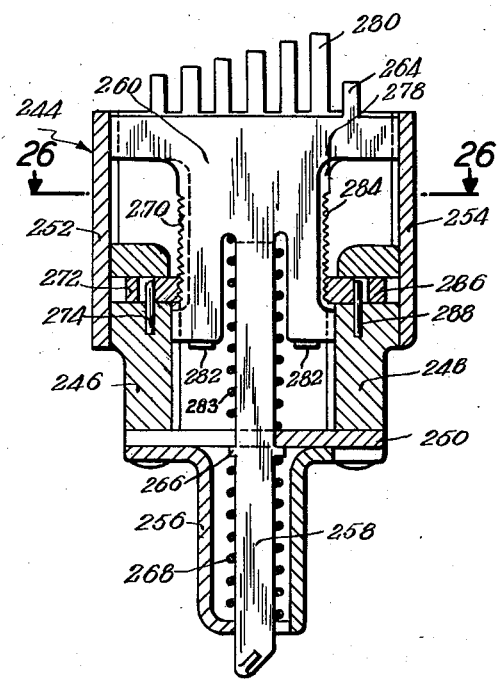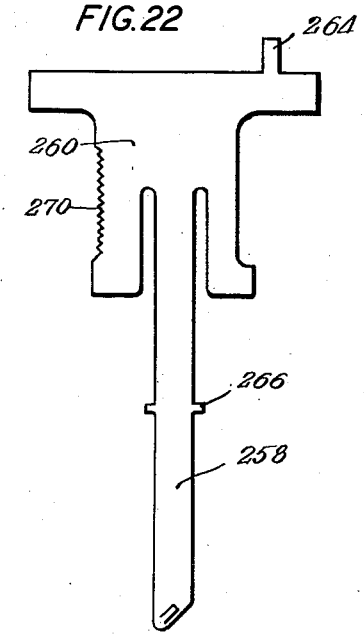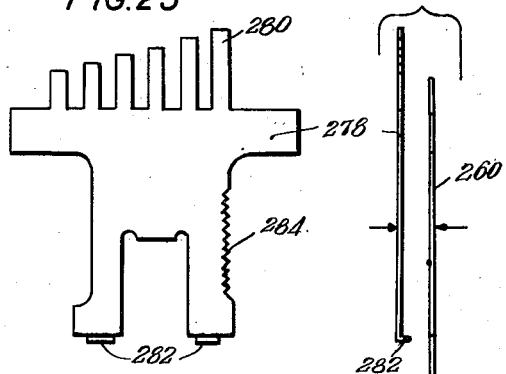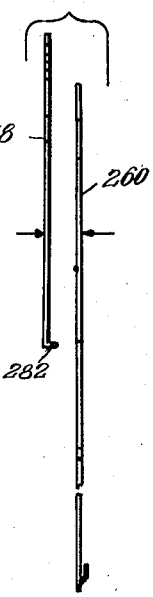

May 13, 1958  H. F. JAMROGOWICZ  2,834,806
MANUFACTURE OF PILE CARPETS
Filed May 4, 1953  12 Sheets-Sheet 10

INVENTOR
HARRY F. JAMROGOWICZ
BY
ATT'Y.

May 13, 1958  H. F. JAMROGOWICZ  2,834,806
MANUFACTURE OF PILE CARPETS
Filed May 4, 1953  12 Sheets-Sheet 11

INVENTOR
HARRY F. JAMROGOWICZ
BY
ATT'Y.

May 13, 1958 H. F. JAMROGOWICZ 2,834,806
MANUFACTURE OF PILE CARPETS
Filed May 4, 1953 12 Sheets-Sheet 12

INVENTOR
HARRY F. JAMROGOWICZ
BY
ATT'Y.

United States Patent Office 2,834,806
Patented May 13, 1958

2,834,806

MANUFACTURE OF PILE CARPETS

Harry F. Jamrogowicz, Scitico, Conn., assignor to Bigelow-Sanford Carpet Company, Inc., Thompsonville, Conn., a corporation of Delaware Application May 4, 1953, Serial No. 352,874

46 Claims. (Cl. 139—38)

The present invention relates to improvements in the manufacture of carpets and more particularly to an improved apparatus and method for producing on a carpet loom a drawn loop pile fabric of improved quality.

It has been for many years a primary concern of carpet manufacturers to produce on carpet looms looped pile surface fabrics in which pile loop height may be automatically controlled as a useful element of carpet construction and design. Heretofore, limited success only has attended these efforts. Apparatus and methods now in use have limited capacity for selection and control of loop height variation, either weftwise or warpwise of the fabric.

It is a principal object of the invention to produce an improved pile carpet adapted to be woven on a power driven carpet loom, in which the height of each pile loop is individually and accurately controllable over a substantial range, whereby a greatly increased number and variety of carpet pile patterns with novel arrangements of high, low and intermediate height loops are made possible.

Features of the improved carpet construction include the selective use of high, low and intermediate height loops in any combination and in any direction, the accurate gradation of loop height to produce a contoured or carved effect, and the grouping of highs, lows and intermediates to provide support for extremely high loops spotted singularly or in groups over the pile surface, as for cutting by a shearing knife.

Further objects of the invention are to provide an apparatus and method for drawing pile loops to individually predetermined heights from pile warps which will adapt a carpet loom for producing pile carpets in accordance with the invention, in which the individual loops both weftwise and warpwise of the fabric are formed of pre-selected heights.

Other more specific objects of the invention are to provide an apparatus and method for shedding and for forming loops from pile warps on an Axminster type loom having a needle mechanism arranged for inserting the wefts in pairs to produce pile loops of individually graded heights.

The apparatus provided in accordance with the invention for producing the improved loop pile surface carpet herein disclosed comprises a hook bar together with supporting and actuating parts which operate the bar and hooks mounted thereon to engage and to draw upwardly loops of the shedded pile warps, while the lay is operated first to beat up the previously inserted weft shot, and again to beat up the next succeeding tying-in weft shot inserted after the harnesses carrying the pile warps have been moved downwardly to the tying-in position. Following this second beating up operation the hook bar is further manipulated to disengage the hooks from the formed loops.

Specifically, in accordance with the invention, a hook bar having a novel construction and arrangement of the hook elements is provided, which operates in a novel manner and with a high degree of accuracy and precision to form loops of the desired height. The hook elements referred to comprise a series of flat elements, each having a hook projecting from one face thereof. The hooks are particularly shaped so that a downward thrusting movement combined with a slight counterclockwise rocking movement, as shown in Fig. 17 at A, and a return upward movement combined with a slight clockwise rocking movement of the hook bar and elements mounted thereon, as shown in Fig. 17 at B, in combination with a slight lateral movement of the hook bar causes the hooks to engage and to form loops from the pile warps. Each hook is shaped so that for a vertical position of the hook shank the hook opening is canted toward the left, as shown in Figs. 8 and 11, away from the lay. The arrangement is such that a subsequent substantial counterclockwise rocking movement of the hook bar and hooks about the bar axis, as shown in Fig. 17 at C, causes the hooks to be rocked counterclockwise out of engagement with the newly formed pile loops.

Further, in accordance with the invention, a supporting mechanism is provided for the hook bar which comprises a pair of hook bar supporting arms which are arranged to turn about a supporting axis on the machine, and are further arranged to move slightly longitudinally of the pivot axis for causing each hook to be engaged securely with the associated pile warp.

A feature of the invention consists in the provision of a hook bar having mounted thereon a series of hooks of differently positioned heights which are rendered operative by the manipulation of the hook bar to form pile loops of corresponding heights on the face of the fabric. This construction and arrangement of the loop forming mechanism, in which a series of individually adjustable or replaceable hook elements are secured in a single bar which thus forms a single rigidly formed unit operated substantially in the manner described, has been found unexpectedly effective in controlling the height of the loops. It has been found, for example, that variations of $\frac{1}{16}''$ in loop heights are readily obtained and are available to produce a wide range of accurately determined loop heights varying from $\frac{3}{16}''$ up to $\frac{3}{4}''$. It will be understood that the increment of variation may be greater or less than $\frac{1}{16}''$, and that the total differential may be greater or less than the $\frac{9}{16}''$ indicated.

Further, in carrying out the invention, two specific forms of a pattern control are provided for controlling the selections of hook height in the hook bar or bars employed in the forming of pile loops in each successive row of weaving.

In one form of the invention the supporting and actuating mechanism for the hook bar is so constructed and arranged as to permit the association of a different hook bar with the bar supporting and actuating mechanism above referred to for each of a series of rows of weaving which may for example constitute a repeat pattern. For effecting a ready substitution of one bar for another, an endless chain carrier is provided on which is mounted the desired number of hook bars, each bar having the hooks thereof of differently positioned heights in accordance with the requirements of the particular pattern. The active hook bar is supported on its arms by means of clutches. The bars on the endless chain carrier are brought successively to an operating position substantially over the fell so that an upward movement of the supporting arms for the hook bar will cause the clutches on the supporting arms to engage and to remove a hook bar from the endless chain carrier, and, after the pile loops for the particular row of weaving have been formed, to return the hook bar to the carrier.

In another form of the invention a hook bar is employed in which the hooks are individually supported for vertical adjustment within the bar. In this embodiment each hook member is provided at its upper end with a series of pins of different lengths which correspond with different vertical positions of the particular hook. Each hook member is acted upon individually by a retracting spring means which tends to move the hook upwardly to a fully withdrawn position within the bar. A locking device carried by the hook bar is arranged to be operated by cam means on the machine to lock each hook member in an adjusted position on the bar. Cooperating with the hook bar constructed in this manner there is a jacquard type pattern control device which consists of a series of cards carried by an endless carrier and arranged to be brought successively into an operating position above the hook bar. An upward movement of the hook bar supporting arms and hook bar mounted thereon, between successive loop forming operations, causes the hook bar to be firmly placed against the selected card which is perforated in such a manner as to effect an adjustment of each individual hook to the desired vertical position. The hook members are then locked in adjusted position by the operation of the locking device referred to.

Further, in accordance with the invention, another modification of the hook bar is shown in which the individual active hooks are held at a common level during the downward shed penetrating movement of the hook bar, and are thereafter shifted during the loop forming movement of the bar to produce loops of different heights in accordance with the dictation of the jacquard mechanism.

The hook bar together with the hook bar supporting and actuating mechanisms, in the preferred form of the invention illustrated, are shown as applied to an Axminster type loom. It will be understood, however, that the hook bar, the supporting and actuating mechanism therefor and pattern controls herein described are equally applicable to looms of other type including shuttle type, Wilton and velvet carpet looms.

A feature of the invention consists in a construction and arrangement of the lay or reed associated with an Axminster type loom, and in the provision of means for shedding pile warps above the normal shedding level of the machine, whereby it is made possible to shed and to form loops from the shedded pile warps for each successive row of weaving on the loom in accordance with any desired loop height pattern. The newly added upper portion of the reed is cut away in order to permit the operation of the hook bar in a location substantially over the fell without interference.

With the above noted and other objects in view as may hereinafter appear, the invention consists also in the devices, combinations and arrangements of parts hereinafter described and claimed, which together with the advantages to be obtained thereby will be readily understood by one skilled in the art from the following description taken in connection with the accompanying drawings, in which Fig. 1 is a somewhat diagrammatic side view of a loom constructed and arranged to illustrate in a preferred form certain features of the invention;

Fig. 2 is a view on an enlarged scale of a portion of the machine shown in Fig. 1 to illustrate elements of the weaving mechanism which are shown in the positions taken as the pile loop forming hooks are wiping out;

Fig. 4 is a view of parts of the weaving mechanism shown in previous views, the parts being shown in the positions taken when the number 2, or bottom shot, is inserted into the shed, and the hook bar is thrust downwardly through the shedded pile warps;

Fig. 5 is a view of parts of the weaving mechanism shown in previous views, the parts being shown in the positions taken when the number 3, or binder shot, is inserted into the shed, and the hook bar has been withdrawn to form pile loops of selected heights;

Fig. 6 is a detail side view of the cam and follower connections for effecting an axial shift on the hook bar and its supporting arms, adapted for moving the projected hooks laterally into engagement with the shedded pile warps;

Fig. 7 is a rear view of substantially the parts shown in Fig. 6;

Fig. 8 is a fragmentary front view of a portion of a hook bar and elements supported therein having hooks at different selected heights;

Fig. 9 is a sectional view taken on the line 9—9 of Fig. 8, illustrating particularly the manner in which the hooks are soldered in place in the hook bar;

Fig. 10 is a detail view showing a series of pile loop-forming hooks of different vertical positions adapted for forming warp pile loops ranging from substantially 3/16" to 12/16" in height;

Fig. 11 is a fragmentary view on an enlarged scale of the hook designated by the number 3 in Fig. 10 looking from the right;

Fig. 12 is a view similar to Fig. 9 but showing an alternate method of securing the hook elements in position in the bar;

Fig. 13 is a view in side elevation of the reed forming part of the reciprocating lay;

Fig. 14 is a fragmentary view in front elevation of the reed shown in Fig. 13;

Fig. 15 is a detailed view of the yarn heddle cam;

Fig. 16 is a detailed view of the hook arm cam;

Fig. 17 is a timing chart showing the relative timing of the several operating mechanisms of the loom;

Fig. 18 is an enlarged sectional view of a carpet woven in accordance with the invention;

Figs. 19–28 illustrate alternate forms of hook bar and of an associated control mechanism for obtaining a different hook selection in successive rows of weaving; of which Fig. 19 is a view looking from the left of parts of the weaving mechanism including a hook bar with individually adjustable hooks, a jacquard device, and a control device for locking and unlocking the hook members;

Fig. 20 is a sectional view of the hook bar shown in Figs. 19 and 25;

Fig. 21 is a sectional view of an alternate form of a hook bar shown in Fig. 26 in which are provided a series of jacquard controlled jacks interposed between the hook members;

Fig. 22 is a detailed view of the hook member employed in the embodiment of the invention shown in Figs. 21 and 26;

Fig. 23 is a detailed view of the jacquard controlled jack employed in the embodiment of the invention shown in Figs. 21 and 26;

Fig. 24 is an enlarged view looking from the right of the associated hook and jack members illustrated, for example, in Fig. 21;

Fig. 25 is a plan view of a hook bar having individually adjustable hooks similar to those shown in Fig. 20, illustrating particularly the toggle actuating locking mechanism for the hook members;

Fig. 26 is a plan view of a hook bar having individually adjustable hook members and jacquard controlled jacks therefor such as those disclosed in Figs. 21 and 24, inclusive, and illustrating particularly the toggle actuation for locking each of the hook members and controlled jacks in adjusted position;

Fig. 27 is a sectional view taken on line 27—27 of Fig. 25, the alternate position of the toggle actuating lever being shown in dot and dash lines;

Fig. 28 is a fragmentary view similar to Fig. 27 of the two toggle actuating levers shown in plan in Fig. 26;

Figure 3:
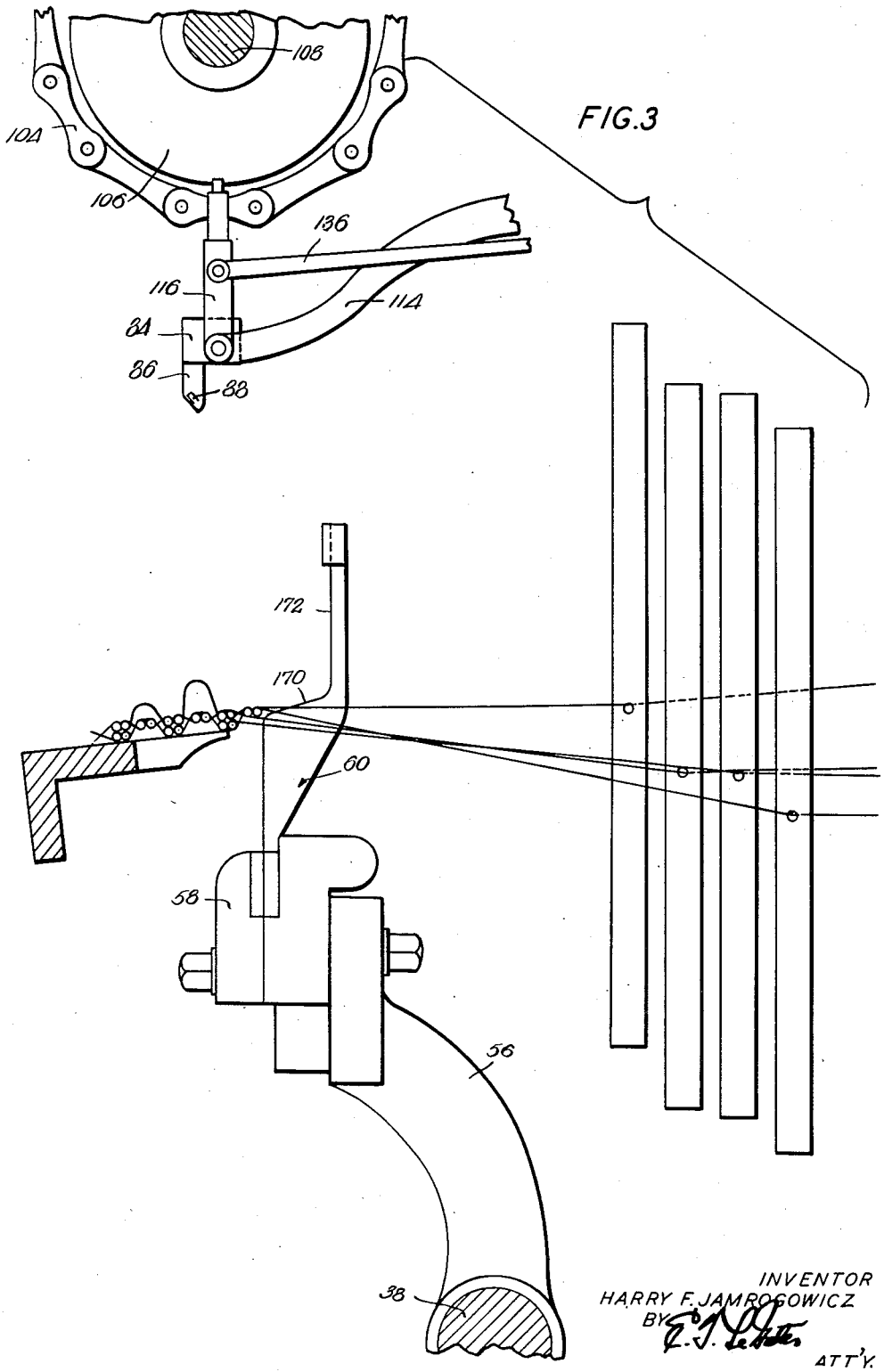
Fig. 3 is a view on a still larger scale of parts of the weaving mechanism shown in the previous views, the hook bar arms being shown in the position of clutching a hook bar from the endless chain carrier.

Referring specifically to the drawings, Figs. 1 and 2 illustrate basically portions of a carpet loom embodying features of the invention including a machine frame having side frames 30, a guide plate 32 for supporting the newly formed fabric as it is beaten up by the lay, and a breast plate 34 over which the fabric is drawn from the machine extending between the frames. The side frames 30 provide support for various operating shafts including a main cam shaft 36 carried in bearings 37 on the frames 30, a lay pivot shaft 38, a fabric take-up shaft 40 which carries a fabric take-up roller 42, and a small idler roller supporting shaft 44. The loom is provided with suitable harness frames including a stuffer warp harness frame 48, a semi-stuffer warp harness frame 50, and a chain warp harness frame 52. The loom is further provided with a weft inserting needle generally indicated at 54 in Fig. 2, which operates to insert doubled or looped weft thread into the shed. Successively inserted loops of the weft are enchained with one another to form a selvage by means of a reciprocating looper device, not shown. There is also provided a pile warp harness frame 55 which cooperates with the pile loop forming mechanism provided in accordance with the invention as hereinafter more fully set forth.

The lay comprises a pair of upwardly extending arms 56 pivoted on rocker shaft 38, and provided at their upper ends with holders 58 in which is mounted a reed 60. Forward and backward movements are imparted to the lay 56 by means of a downwardly extending arm 62 secured to rocker shaft 38 and connected by means of a link 64 with the upper end of a cam lever 66 which is pivotally connected at its lower end 68 to a portion of the machine frame. A cam follower 70 supported on the cam lever is adapted for engagement with a lay operating cam.

The several harness frames are arranged to be moved up and down to form successive warp sheds by ordinary jacquard and cam mechanisms well known in the art.

Inasmuch as the elements of the loom above referred to are well known in the art, as shown for example in U. S. Letters Patent No. 1,904,939, dated April 18, 1933; U. S. Patent No. 233,290, dated October 12, 1880; and in U. S. Patent No. 1,475,261, dated November 27, 1923; a more detailed illustration or description of these parts is deemed unnecessary and will be omitted.

The loom thus generally described is adapted to produce an Axminster type fabric ground. As best shown in Figs. 17 and 18, the loom is set up to produce a so-called conventional three-shot weave in which three successive weft shots, each comprising a pair of wefts, are inserted into successively formed sheds for the production of each successive row of weaving. The three shots, as entitled in Figs. 17 and 18, comprise a bottom shot, a binder shot and a row shot which are inserted through successively formed sheds in that order. The various weft shots are located in their respective high and low positions at opposite sides of stuffer warps 76, being held in position by chain warps 78 and semi-stuffer warps 80. The pile warps are shown at 82.

The mechanism provided in accordance with the invention, for producing on a carpet loom loop pile fabric having pile loops varying in height both warpwise and weftwise, comprises a hook bar 84 which, as best shown in Figs. 8, 9 and 12, has mounted thereon a series of replaceable hook elements 86, each having formed in one face thereof a hook 88 which is located on the element 86 to form a loop of selected height. The hook bar is supported, as hereinafter set forth, to be moved or projected downwardly so that the hook elements are moved between shedded pile warps (see insert A in Fig. 17), are then moved slightly laterally and are withdrawn to engage upon and draw loops of said pile warps upwardly on the hooks (see insert B Fig. 17). Finally, the hook bar is rocked in a counterclockwise direction (see insert C in Fig. 17) to free the drawn and tied-in loops from the hooks. The hook elements 86 are particularly constructed and arranged to be moved in the manner described. As shown in Figs. 8 and 9, each hook member comprises a flat metal element formed at its upper end with a pair of notches 90 and fitted and soldered into a slotted holder plate 91. An alternate construction shown in Fig. 12 includes a cover plate 94 having a pair of locking ribs 96 engaging in the notches and secured by screws 98 to the hook bar 84. The hook 88 formed on the face of each hook element 86 has its opening facing upwardly and to the left of the vertical as shown, for example, in Figs. 9 and 12, so that a rocking movement of the bar 84, counterclockwise, will be effective to cast off or free the drawn and tied-in loops from the hooks.

It will be noted that the hooks, as shown in Fig. 10, are spaced upwardly by different amounts on the hook elements 86 so that they will be caused to form loops of different heights from the engaged pile warps, a hook disposed toward the lower end of the hook element being adapted to form the lowest loops, and the hook disposed at the highest point on the hook element acting to form the highest loop.

It will be noted that each of the hook elements at its lower or hook end is cut away along one edge to provide a maximum of clearance between the hook bar and the surface of the woven fabric, particularly during the counterclockwise rocking movement of the hook bar 84, to disengage the drawn and tied-in loops from the hooks 88.

The hook elements 86, identical except for the location of their hooks 88, are freely interchangeable so that an accurate control of the height of each individual loop along the length of the hook bar is attained by the selection and placing of hook elements having correspondingly formed hooks in the bar.

In the form of the invention particularly illustrated in Figs. 1 to 14, it is contemplated that a separate hook bar, having a desired selection of high, low and intermediate hooks, will be provided for the formation of the pile loops with each successive row of weaving required for the construction of a desired carpet pile surface pattern.

For storing and for moving the hook bars successively to an operating position, and for moving the hook bars into and out of operating position, use has been made of an endless chain carrier mechanism, clutching devices and clutch arms which may be similar to those provided, for example, with the Axminster looms described in the above noted patents. Inasmuch as the clutches and the devices for detachably securing the hook bar to the endless chain carrier are fully shown in one or more of the patents referred to, these parts will be described only so far as necessary to indicate the connection of the present invention therewith.

The endless chain carrier provided in accordance with the invention comprises a pair of endless chains 104 passing around sprockets 106 on a carrier drive shaft 108 located substantially above the weaving point on a pair of forwardly extending brackets 110 formed integrally with the upper portion of the side frames 30. The endless chain carrier 104 may be of any desired length, being suitably supported along its length above the machine. The endless chain carrier 104 provides support for a group of hook bars such as that indicated in Figs. 3, 4, 5 and 8 which are mounted at intervals on carrier links of the chains. The endless chain carrier is adapted to have imparted thereto stepped feeding movements timed with relation to the rotation of the main cam shaft. The actuating mechanism may, for example, be a pawl and ratchet stepped feed device including a ratchet 111 on shaft 108, a pawl lever 112, link 113 and cam actuated lever 115 (see Fig. 1) which is operated by means of a cam on the main cam shaft and acts to impart a stepped rotational movement to the carrier drive shaft 108. Since a feed device of this description is well known for use on Axminster looms for the moving of tuft spool frames successively into position and since such a device is fully illustrated in the patent to Dunn 1,475,261, above referred to, further description of this mechanism is believed unnecessary.

The hook bars 84 are brought successively to an operative position above the weaving point where each hook bar, in turn, is detached from the chain and moved downwardly into active operation by means of a hook bar actuating mechanism which includes a pair of hook bar actuating arms 114 and associated clutches 116 which are pivotally supported at 117 on the arms 114.

The mechanism for holding the hook bars in the chains and for releasing the hook bars from the chains is of a type normally employed for the holding and releasing of the tube frames of an Axminster loom as shown, for example, in the patent to Barrett No. 1,904,939. Further description of this mechanism is believed unnecessary and is therefore omitted herein. The clutches 116 are operable to detach and to reengage the hook bars with the carrier chains as best shown in Figs. 2 and 3. Each arm 114 is pivoted at 118 to a member 120 to swing in a substantially horizontal plane, the member 120 being, in turn, supported on a horizontally disposed shaft 122 to swing in a substantially vertical plane. The shaft 122 is rocked to move the hook bar actuating assembly between raised and lowered positions by a mechanism which may be of ordinary description comprising a vertically disposed link 124 connected at its upper end to one of the members 120 and connected at its lower end to a cam lever 126 having a follower roller for engagement with a cam 128 on the main cam shaft 36 (see also Fig. 16). To move the clutches 116 toward and away from the ends of the hook bars for the purpose of disengaging a hook bar from the chains, and thereafter of releasing to the chains a hook bar which has been returned, the arms 114 are moved toward and away from each other by means of connections not here specifically illustrated since these parts are conventional and operate in a manner well known in the art. This mechanism may comprise two links connecting the rear ends of arms 114 with opposite ends of a vertically disposed pivoted arm which is rocked by a suitable cam and follower connection with cam shaft 36 swinging the arms 114 toward and away from one another.

In accordance with the present invention the arms 114 are caused to rock up and down while at the same time the clutches 116 and hook bar 84 mounted thereon are turned slightly on their pivots 117 to engage with and form pile loops of the desired height from the raised pile warps. A lateral movement is imparted to the hook bar and hooks while projected through the pile warp shed so that each hook member is shifted transversely to engage each pile warp with certainty in the associated hook. The mechanism for rocking the clutches 116 and hook bar 84 about the pivotal connections at 117 comprises a pair of links 136, each connected between a clutch 116 and an upwardly extending arm 138 secured to a rocker shaft 140. A second arm 142 secured to the rocker shaft is connected by a link 144 with a cam follower lever controlled by a cam, not specifically shown, on the main cam shaft 36.

The entire assembly comprising the actuating arms 114, the supporting members 120 and pivot shaft 122 to which they are secured is shifted as a single unit through the small distance required to effect a lateral shifting movement of the hooks. To this end the rocker shaft 122 is bored axially at each end and mounted to turn on two bearing pins 150 carried on the frame 30 (see Figs. 6 and 7), and is further arranged for a limited axial movement with relation thereto. Axial movement is imparted to the shaft 122 and to the hook actuating assembly carried thereby by means of connections which include a bell crank 152 pivoted at 154 on the frame 30, one arm of the bell crank being provided with a bifurcated yoke and trunnions 156 which engage with a groove formed in a collar 158 secured to the shaft. The other arm of the bell crank is connected by an adjustable link 160 with a cam lever 162 which is supported to turn on a pivot 164 on the frame and is provided with a follower roller 166 which rides on a cam 168 on the cam shaft 36.

As shown in Figs. 3, 4 and 5, and more particularly in Figs. 13 and 14, the reed 60 has a novel shape which causes the reed to cooperate effectively with the hook bar for the forming of pile loops of different predetermined heights. Below and up to the beating up level the reed is constructed and shaped in the normal manner to engage and to beat up the successively inserted weft shots into the fell. Above the level of the fell the blades of the reed are cut back sharply at 170, and thereafter in accordance with the invention are extended upwardly at 172 to accommodate a pile warp shed which is located substantially above the normally employed Axminster ground fabric shed to provide adequate clearance for the insertion of the pile loop forming hooks.

The arrangement shown is novel and has substantial advantages over shed forming and beating up operations of the prior art. With the construction illustrated, the hook bar is mounted substantially over the beating up point and is well adapted to cooperate in a most efficient manner with the reed and the shedding devices to engage with and to form a row of pile loops. The operating relationship of the reed and the hook bar has been found to be most effective in the drawing of loops of the shedded pile warps to a height which corresponds exactly with the vertical position of the cooperating hooks, and which causes the loops as they are beaten into the fell to stand upright in the fabric.

The mechanism for controlling the positions of the stuffer warp harness frame 48, the semi-stuffer warp harness frame 50, and the chain warp harness frame 52, corresponds with such mechanism normally provided for shedding in an Axminster loom, is well known in the art, and is therefore not here specifically shown or described. The mechanism for controlling the position of the pile warp harness frame 55 provided herewith, and as specifically shown in Fig. 1, comprises a link 174 connected between the lower edge of the harness frame 55 and a horizontally disposed cam lever 175 supported to turn on a pivot 176 on the frame 30. The cam lever 175 is provided with a roller 177 which engages a pile warp heddle cam 178 on the main cam shaft 36 (see also Fig. 15).

The operation of the hook bar 180 to engage with and form a row of pile loops from pile warps raised in the form of a shed by pile warp harness 55 will be summarized with reference to Figs. 2–5 and 17 of the drawings, as follows:

As will clearly appear from these figures, the hook bar is constructed and arranged to support the drawn pile loops during the subsequent tying-in and beating up operation in a vertical position directly over that portion of the reed employed for beating up the successively inserted shots into the fell. The fact that all of the hook elements are mounted in a rigidly formed member extending entirely across the fabric insures that the loops drawn will each have a height which corresponds exactly with the position of the individual hook on its supporting member 86.

Fig. 3 shows the operation of the hook bar supporting arms 114 to take a new hook bar 84 from the chains 104. This operation takes place during the operation of inserting and beating up the row shot into the fell.

Fig. 4 shows the downward and counterclockwise movement of the hook bar which is followed as the hook bar reaches the extreme downward position of Fig. 4 by a lateral movement to cause the offset hooks 88 to engage with the shedded pile warps. As shown in Fig. 4, the needle has been inserted to draw the bottom shot through the shed. The diagram A in Fig. 17 shows the parts at a slightly later point in the operation in which the hook bar has started its return rocking and upward movement to draw the loops, and in which the two legs of the bottom shot have been drawn through the shed.

Fig. 5 shows a subsequent position of the hook bar at the upward limit of its loop drawing movement, the reed having advanced to beat up the bottom shot and the needle 54 having been again inserted to draw the binder shot through the shed. Diagram B in Fig. 17 illustrates a slightly later stage of the operation in which the two legs of the binder shot have been drawn through the shed.

After the beating up operation of the binder shot takes place, the hook bar 84 is rotated rapidly in a counterclockwise direction to the position shown in diagram C in Fig. 17 to free the hook elements 88 from engagement with the drawn and tied-in pile loops.

In Fig. 2 the hook bar is shown in the position taken after completion of the counterclockwise wiping operation and as the hook bar starts upwardly on its return movement to the carrier chains 104.

Diagram D in Fig. 17 shows the parts at a still later point of the operation in which the two legs of the next row shot have been drawn through the shed.

An alternative form of the invention, specifically illustrated in Figs. 19–28 of the drawings, consists in the provision of a hook bar having mounted therein hook elements which are capable of individual automatic adjustment to different vertical positions in accordance with any desired variation in loop height in a row of weaving. In this form of the invention a pattern control of the selection of loop heights from one row of weaving to the next is achieved by means of a jacquard mechanism comprising a series of perforated cards which are employed to effect successive vertical adjustments of the hook elements in the hook bar.

In this embodiment of the invention the hook bar is supported on a pair of supporting arms and operates in the manner previously described to draw and thereafter to cast off the beaten up row of pile loops.

The endless chain carrier utilized in the previously described embodiment of the invention, for moving successive hook bars into position to be rendered operative, is, in the alternative form here described, used to feed a series of perforated cards of a jacquard control to a position in which an extreme upward movement imparted to the hook bar carrier arms is effective to move the modified hook bar into operative relation to the perforated card presented thereto.

Referring more specifically to Fig. 19 of the drawings, a hook bar 180 is provided which is pivotally mounted at its two ends to rotate on pivots 181 on hook bar supporting arms 182 which are carried on a rocker shaft 184 mounted on the supporting bearing pins 150 shown in Fig. 7. Since the hook bar 180 with this embodiment of the invention is permanently supported on the supporting arms 182, the clutches previously described have been omitted. Up and down movements are imparted to the arms 182 by means of the connections above described and shown in Fig. 1 which include the vertically disposed link 124 which, in the embodiment shown in Fig. 19, is connected at its upper end to one of the supporting arms 182. At its lower end the link 124 is connected to the free end of the cam lever 126 controlled by cam 128 on the main cam shaft 36.

The up and down movements imparted to the arms 182 are identical with the up and down movements imparted to the hook bar actuating arms 114, previously described in connection with the form of the invention illustrated in Figs. 1–16, inclusive. The movements include the down and up movements imparted to the hook bar to engage and draw a row of pile loops from the shedded pile warps, and include further an extreme upward movement which may be described as a pattern shift movement of the hook bar supporting and actuating mechanism.

The hook bar supporting rocker shaft 184 is shifted axially in order to impart a slight endwise movement to the hook bar actuating assembly, and thereby to engage the hooks firmly with the associated pile warps by means of the shifting mechanism including the bell crank 152, link 160, cam lever 162 and cam 168, above described and particularly illustrated in Figs. 6 and 7. The mechanism, by means of which rocking movements are imparted to the hook bar 180 is similar to the hook bar rocking mechanism particularly illustrated and described in connection with Figs. 1 and 2. As shown in Fig. 19, this mechanism includes a pair of links 196 connected at their forward ends to the hook bar 180 and at their rear ends connected with the upwardly extending arms 138 of the hook bar rocking mechanism above described.

Figure 25:
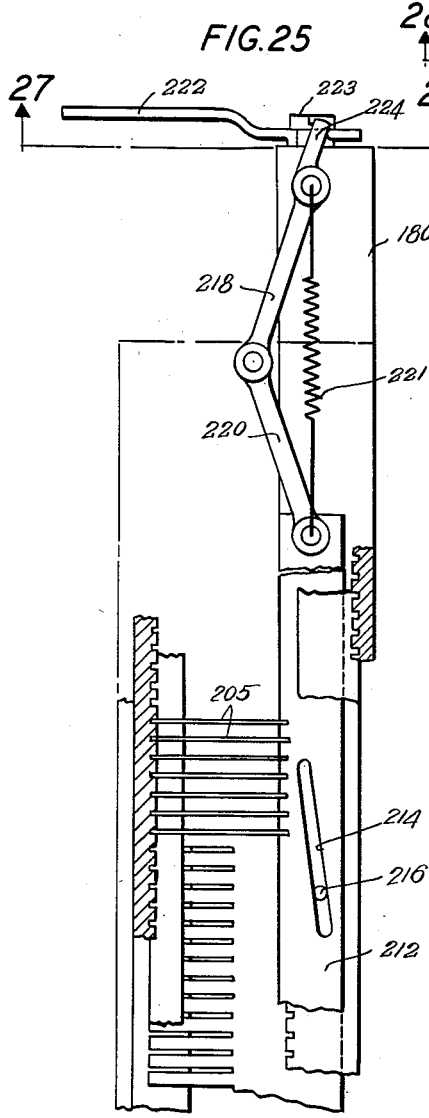

Figs. 20 and 25 illustrate one form of a hook bar having jacquard controlled adjustable hook elements. The hook bar 180 is provided with a series of loop drawing hook elements 200 which are particularly constructed and arranged to be individually adjusted lengthwise of their shanks in the hook bar 180. Adjustment is effected by means of a jacquard device consisting of a series of perforated cards 201 (Fig. 19) which are presented successively in operative relation to the hook bar 180 following the drawing of each successive row of pile loops. The cards 201 are connected to one another in the form of an endless belt which passes around hexagonal supporting discs 203 supported on the shaft 108, this being the same shaft which is utilized to support the endless carrier chains 104 employed for supporting and for moving into operative position the successive hook bars of the embodiment of the invention shown in Fig. 1. A stepped advancing movement is imparted to the shaft 108 and the endless belt of jacquard cards 201 by means of the mechanism previously illustrated and described in connection with Fig. 1 including pawl lever 112, link 113 and cam lever 115. The operation of this mechanism is such as to bring a next succeeding card 201 into operative position to cooperate with the hook bar 180 with each successive upward movement of the hook bar 180 with its supporting arms 182 to the extreme high pattern control position.

The hook elements 200 are identical in construction, each comprising a flat stamping having a relatively narrow downwardly projecting shank portion with a hook 202 formed in one face of the stamping substantially at the lower end of the shank. The edge of the shank is bevelled off at the right hand lower corner designated at 204 in the manner previously described to provide a maximum clearance between the hook and the fabric and adjacent portions of the reed during the rocking loop casting off movement of the hook bar. The upper portion of the hook element 200 is widened out, as indicated at 205, providing two edge portions which are slidably supported in slots formed in the front wall 206 and rear wall 207 of the hook bar. At its upper end the hook element is provided with a series of upwardly projecting fingers 208 of different graduated lengths for engagement with successively presented cards of the jacquard mechanism. A compression spring 210, coiled about the shank portion of the hook element 200 and seated at one end against the widened portion 205 and at its outer end abutting a bottom plate 211 of the bar 180, serves to maintain the hook element normally in a fully raised or retracted position.

In the operation of the hook length control device, as shown in Figs. 19, 20 and 25, the hook bar 180 is presented against a perforated card 201, thus causing the several hook elements to be positioned in accordance with the dictation of the card. The hook elements are then automatically locked in the adjusted position. The locking device comprises a locking element in the form of a metallic strip 212 which extends along the length of the hook bar 180, and is provided with a longitudinally grooved edge which is adapted to engage with a corresponding series of notches or serrations formed in the edge of the widened out portion 205 of each hook element. The locking element 212 is supported in the bar for a limited endwise movement which is employed to effect a simultaneous lateral movement of the locking element into and out of locking engagement with the hook element. To this end a plurality of diagonal slots 214, of which one is shown in Fig. 25, are formed in the locking element 212 to receive guide pins 216 formed on the hook bar on the under guide surface for the locking element 212.

The mechanism for shifting the locking element into and out of hook locking position comprises a pair of toggle links 218, 220 which are pivotally connected together, the link 218 being pivotally secured to the hook bar 180 and the link 220 at its free end being pivotally connected to the locking element 212. A tension spring 221 connected between the locking element 212 and the hook bar tends to move the locking element into locking position to the left. When the toggle links are straightened the locking element 212 is moved to the right against the pressure of the spring 221 so that the slots 214 engaged by the relatively fixed pins 216 will cause the locking element to be moved laterally away from the hooks. Movement of the toggle between straightened and collapsed position is controlled by means of an actuating lever 222 pivoted at 223 on the hook bar and extended forwardly therefrom or in a direction transverse to the length of the bar. An upwardly extending arm of the lever 222 is arranged to engage behind a tail 224 of the toggle link 218 so that a downward movement of the actuating lever 222 to the dot and dash position shown in Fig. 27 causes the toggle links 218, 220 to be moved to their straightened hook element release position.

In accordance with a feature of the invention a mechanism is provided which is rendered operative as the hook bar 180 is moved upwardly into a jacquard card engaging position to straighten the toggle 218, 220, and thereby to unlock the individual hook members. This mechanism, as shown in Fig. 19, comprises an actuating arm 226 which is pivotally supported at 228 on the machine, and is arranged to extend rearwardly into the path of the upwardly moving hook bar assembly including control lever 222. The arm 226 is connected by a vertically disposed link 230 with a cam actuated lever 232 supported on a pivot 234 on the machine, and is provided with a follower roller 231 which engages with a cam 238 on the main cam shaft 36 in the machine. A spring 240 connected with the cam actuated lever 232 acts to maintain the roller in engagement with its cam.

The operation of the mechanism for effecting successive adjustments of the hooks in the hook bar 180, specifically illustrated in Figs. 19, 20, 25 and 27, to produce different selections of high, low and intermediate loops to be drawn by the hook bar is as follows:

Following the completion of a previous loop drawing and loop casting-off operation, the hook bar 180 is moved upwardly to the high pattern control position, shown in dot-and-dash lines in Fig. 19, in which the pins 208 are engaged with a pattern card of the jacquard mechanism. During this upward movement the actuating arm 226 engages with and supports the control lever 222 in the fully depressed position indicated in dot-and-dash lines in Fig. 19 to straighten the toggle links 218, 220 so that the locking element 212 is moved to its retracted or inoperative position. The hook elements 200 are thus permitted to rise under the influence of their respective springs 210, and are automatically brought to the desired position of adjustment as a selected nib 208 engages an unperforated portion of the pattern card 201 presented thereto. Prior to the starting of the downward movement of the hook bar 180 and supporting arms 182, the actuating lever 226 will be moved to its extreme high position permitting the control lever 222 to rise, and the toggle links 218, 220 to return to their collapsed position under the influence of spring 221 so that the several hook elements 200 are locked in their adjusted positions.

Figure 26:
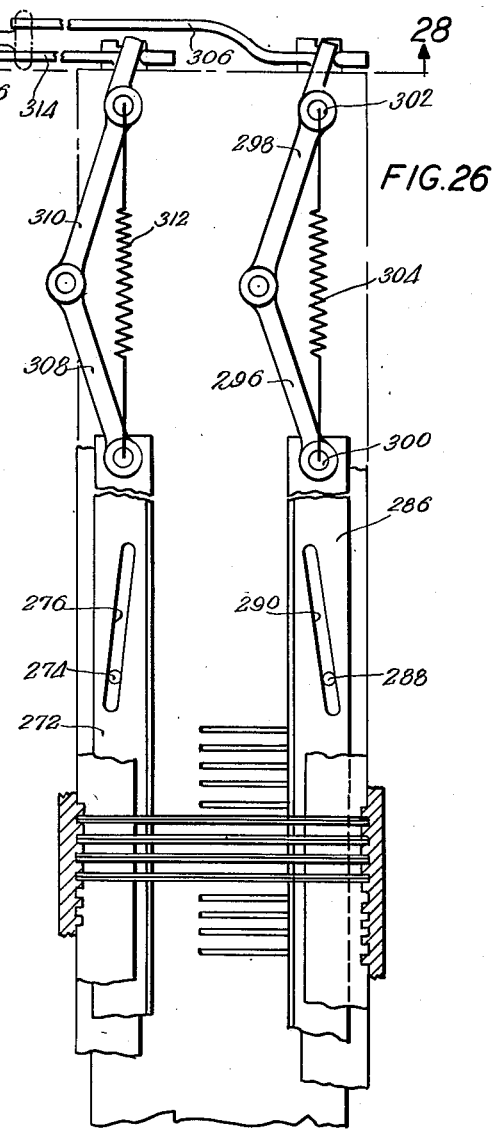
Figure 27:
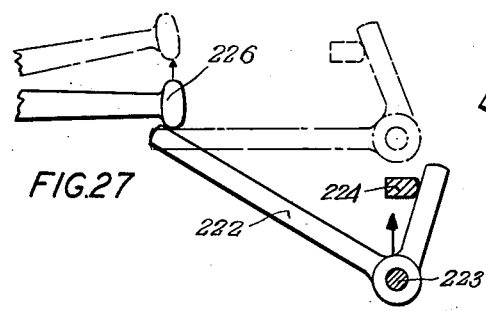
Figure 28:
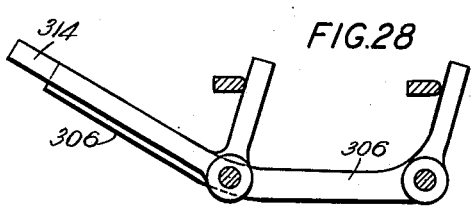

Figs. 21–24 inclusive, Figs. 26 and 28 illustrate a modified form of hook bar having individually adjustable hook elements and associated therewith jacquard controlled jack elements which are positioned in accordance with the desired selection of high, low and intermediate pile loops, but which permit the hooks to be inserted into the shed while remaining in an evenly aligned position, and thereafter to be moved to adjusted positions in accordance with the setting of the individual jacks during the loops drawing movement of the hook bar.

The modified hook bar generally designated at 244 comprises two rails 246 and 248 secured in parallel relation to a slotted base plate 250, and two additional vertically grooved side plates 252, 254 secured respectively to the rails 246, 248. The hook bar 244 is further provided with a downwardly extending guard 256 bolted to the underside of the base plate 250 and having at its lower end slots through which hook elements 258 are guided and supported as best shown in Fig. 21. Each hook element 258 is formed with a relatively long shank portion and towards its upper end with a wide upper portion 260 with edges arranged to be guided in vertical slots formed respectively in the rails 246, 248 and in the slotted side plates 252, 254. Each hook member 258 is provided on its upper edge with a single upwardly extending finger 264. Each hook element 258 is held yieldably in a raised position in which a lug 266 on the shank portion of the hook element 258 is engaged against the bottom plate 250 by means of a compression spring 268 coiled about the hook element and seated at one end against the lower portion of the guard 256, and at its upper end against the lugs 266. Each hook element 258 is provided along the left edge of the upper portion 260 thereof, as viewed in Fig. 22, with serrations 270 which are adapted to be engaged by the longitudinally serrated edge of a locking bar 272 which extends along the length of the hook bar, being supported on the upper face of the side bar 246, and guided with relation thereto by pins 274 mounted in the plate 246 for engagement in diagonal slots 276 provided at spaced intervals along the length of the bar.

The hook bar 244 is also provided with a series of jacquard controlled jack elements 278 which are interposed between the hook elements 258. One such jack element 278 is provided with each hook element. As shown in Figs. 21–23, each jack element 278 is generally similar in shape to the upper portion of the adjacent hook element having edge portions thereof adapted for engagement in the slots formed in the upper plates 252, 254, and additional edge portions adapted for engagement in the slots formed in the side plates 246, 248. On its upper edge, each jack element 278 is provided with a series of upwardly extending fingers 280 of different lengths. The lower edge of each jack element 278 is provided with offset stop elements or tabs 282 which are adapted to engage beneath the associated hook member 258. Each jack element is held yieldably in a raised position with its tabs 282 engaged with its associated hook member 258 by a compression spring 283 surrounding the shank of the associated hook member. Along the right hand edge, as shown in Figs. 21 and 23, each jack element 278 is formed with a serrated edge 284 adapted to be engaged by the longitudinally serrated edge of a locking bar 286 which extends along the front rail of the hook bar and is guided into and out of locking relationship with the respective jack elements by the engagement therewith of pins 288 and diagonal slots 290 spaced at intervals along the length of the bar.

It will be noted from an inspection of Figs. 26 and 28 that two separate control mechanisms are provided for moving the locking bar 272 for controlling the hook members 258, and the locking bar 286 for controlling the jack members 278, into and out of locking position. In the form of the invention shown in these figures it will be noted that the locking bar 286 for the jack elements occupies the same relative position in the hook bar assembly 244 as the locking bar 212, which controls the hook members 200, occupies in the hook bar assembly 180, previously described and shown in Figs. 20 and 25. The control mechanism for the jack locking bar 286 comprises toggle links 296, 298 which are pivotally connected together, the link 296 being pivotally connected at 300 to the locking bar 286, and the link 298 being connected at 302 to the hook bar. A tension spring 304 connected between the pivots 300, 302 tends to maintain the toggle in a broken position in which the locking bar 286 has been moved to its locking position. An extension of the toggle link 298 is arranged to be engaged with an upwardly extending arm of an actuating lever 306 which is similar to, and operates in the same manner as the arm 222, previously described in connection with Figs. 25 and 27 for locking and unlocking the hook members 200 mounted in the hook bar assembly 180. The hook element locking bar 272 of the hook bar assembly 244 is similarly controlled by means of a toggle connection comprising links 308, 310 connected between the hook bar 244 and locking bar 272, and similarly maintained in a broken position by a tension spring 312. In order to straighten the toggle links 308, 310 an extension of the link 310 is arranged to be engaged by an upwardly extending arm of a control lever 314 pivotally secured to the end of the hook bar.

The hook bar assembly generally designated at 244 may be readily substituted for the hook bar 180 shown in Fig. 19, and when supported by the supporting arms 182 will operate in the manner hereinafter set forth. For actuating the hook bar assembly 244 the machine illustrated in Fig. 19 is provided with a number of parts not heretofore referred to, including an actuating lever 316 which is supported at 318 on the machine frame and which is connected intermediate its length to the link 230 to be moved up and down by the cam actuating lever 232. As best shown in Fig. 26, the actuating lever 226, previously described, is provided at its outer end with a lateral extension, one end of which is arranged for engagement with the control lever 222 above described and also with the control lever 306 which is identically shaped and disposed with relation to the attached hook bar and supporting arms 182, and which is arranged to control the locking and unlocking of the jack elements 278. The other end of the lateral extension of actuating lever 226, as shown in Fig. 26, is arranged to engage with the control lever 314 of the modified hook bar 244 in order to control the locking and unlocking of the hook members 258. The control lever 314 is arranged also in alignment with and is adapted to be acted upon by the actuating lever 316 which, however, does not engage with or affect the operation of the shorter control lever 306 or its counterpart, control lever 222, of the construction shown in Figs. 19 and 27. The actuating lever 316, which has an operating function only when the hook bar 244 is in use, is controlled by means of a depression or dip indicated at 320 in cam 238 which causes the control lever 316 to move downwardly and then up at a time when the hook bar supporting arms 182 and hook bar are in a relatively depressed yarn loop forming position. The corresponding movement imparted to the actuating lever 226 at this time is an idle movement having no other function.

The operation of the machine as shown in Fig. 19, but with the hook bar 244 of Figs. 21 and 26 substituted for the hook bar 180 of Figs. 20 and 25, is as follows:

Following the completion of a previous loop drawing and loop casting-off operation, the hook bar supporting arms 182 and hook bar 244 are moved upwardly to the high pattern control position in which the fingers 264 of the hook member 258 and the fingers 280 of the jacks 278 are brought to operative position by the perforated card 201, which has been brought to operative position by rotation of the shaft 108 and hexagonal discs 203. During this upward movement the actuating arm 226 engages with and supports in a fully depressed position both of the control levers 306 and 314 so that the toggles controlled thereby are relatively moved to a straightened position, and the locking bars 286 and 272 are moved out of locking engagement with the respective jacks 278 and hook members 258 which are thus permitted to rise under the influence of the respective springs. The position of each hook member 258 at this stage of the operation is controlled by the engagement of the finger 264 with the pattern card. If no loop is to be formed by the particular hook, the card will be perforated to allow the hook to rise to a relatively raised inoperative position. If, however, a loop is to be formed by the particular hook, the hook will be moved downwardly to a warp engaging position determined by the length of the finger 264. Since all of these fingers are of the same length, and the hook elements 258 are in all respects identical, the hooks will be evenly aligned as to depth along the length of the hook bar. At the same time the jacks 278 are individually positioned in accordance with the location of the perforations in the card, being moved downwardly against the action of the springs 283 by engagement of one of the fingers 280 with the card, the fingers longer than the engaged finger entering perforations in the card. If no loop is to be formed by the particular associated hook, the card will be provided with perforations of all of the fingers 280. With this arrangement the control jack 278 will be located either at the same level or in a relatively depressed position in which the stop tabs 282 are depressed out of engagement with the stop surfaces on the hook members 258. An upward movement of the actuating lever 226 to its extreme high position in the manner above described now permits the respective toggles to be broken and the locking bars 272, 286 to lock the respective hooks and the jacks in their adjusted positions. As previously noted, the hooks, except for those which have been raised out of operation, are in even alignment. The jacks have been positioned in accordance with the different height of loops which are to be drawn.

The hook bar supporting arms 182 and hook bar are now moved downwardly, and the hook bar is rocked slightly in a clockwise direction to cause the hook members 258 to be inserted into the shed, a slight lateral movement is imparted to the hook bar, and finally the hook bar is withdrawn to draw loops from the shedded pile wraps. The construction shown in which the elements 258 have their hook portions located at the extreme ends of the hook shanks, and in which all the active hooks are evenly aligned, permits the hooks to be moved into pile wrap engaging position without penetrating much beneath the level of the shedded pile wraps. The hooks are thus enabled to engage portions of the shedded pile wraps which are close to the point of attachment to the completed fabric without risk of interference with the operation of the reed.

At the beginning of the loop drawing movement of the hook bar the actuating arm 316, which is positioned above the control lever 314 by the downward movement of the hook bar to the warp engaging level, is moved downwardly through engagement of the roll 231 on cam lever 232 with the dip 320 in the cam 238 to engage and rock the control lever 314, thus causing the locking bar 272 for the hooks to be moved to its inoperative position. The upward movement of the hook bar 244 causes the pile yarns engaged in the several hooks to draw the individual hook elements downwardly to positions determined by the jacquard controlled adjustment of the cooperating jacks 278. The readjustment of the hook elements 258 thus effected causes loops of different heights to be drawn through the fabric depending upon the positions of the several jacks. As the hook bar supporting arms 182 and hook bar 244, carried thereby, approach the upward limit of their loop drawing operation, actuating arm 316 again rises, permitting the hook members to be locked in their readjusted positions. The hook bar is thereafter rocked sharply in a clockwise direction, as shown in Fig. 19, and is slightly depressed to disengage the newly formed pile loops from the hooks to complete the cycle.

A pile carpet having novel features of construction and design is produced in accordance with the invention on a carpet loom constructed and arranged and operating in the manner above described. The product is a loop pile carpet in which the pile loops in each successive row of weaving are drawn individually to variable exactly predetermined heights in order to produce a fabric having a loop pile structure which has distinctive qualities of precision and regularity and a range and variety of surface shapes not obtainable with looms of the prior art. It is possible, for example, to secure an extremely accurate gradation of loop heights by small amounts both weftwise and warpwise of the fabric, and also to place adjacent one another, in any direction, extremely high and extremely low loops to produce curved surfaces either separately or in combination with sharply edged grooves or ridges to produce sharply etched or carved effects.

Figure 29:
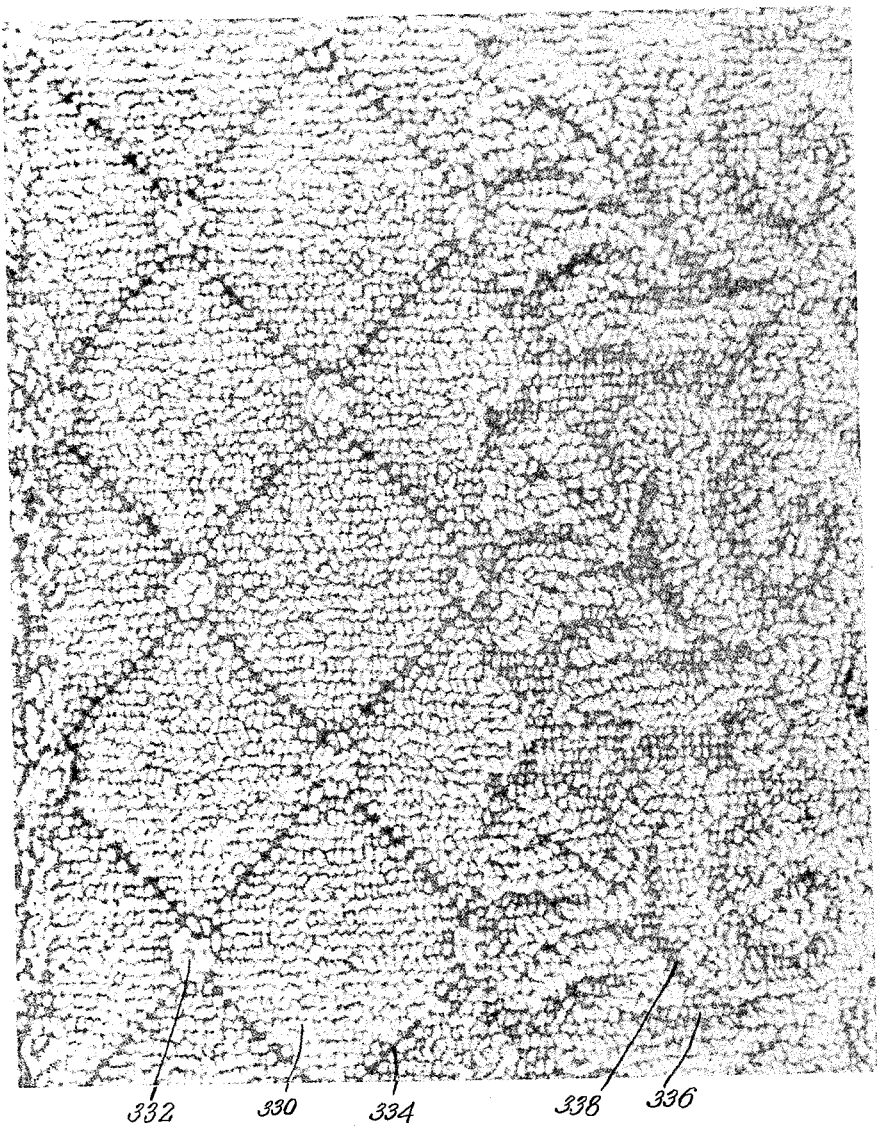
Fig. 29 is a photographic representation of two samples of a loop pile floor covering showing different arrangements of loop heights.
Figure 30:
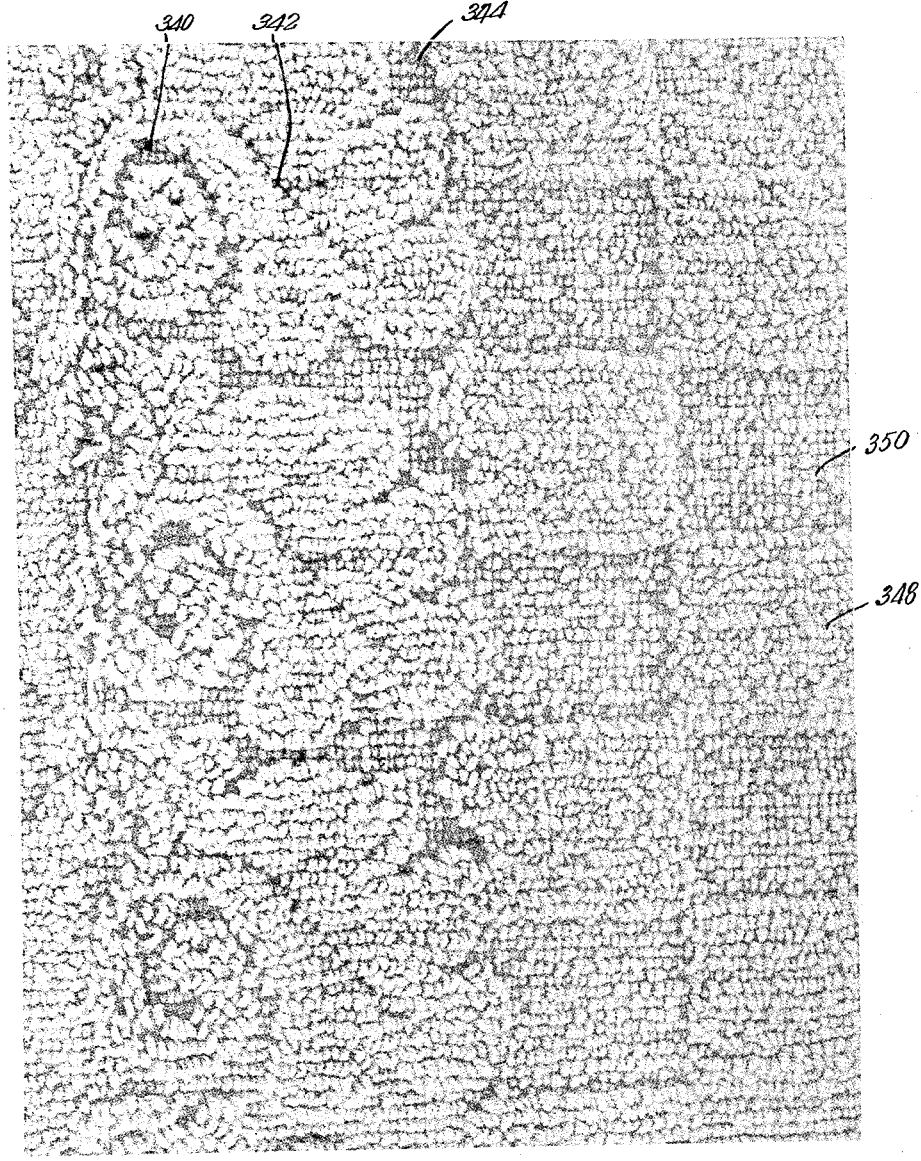
Fig. 30 is a photographic representation of a loop pile floor covering illustrating two additional arrangements of varying heights of pile in accordance with the invention.

The fabric produced upon the illustrated loom, and specifically shown in Figs. 18, 29 and 30, consists of an Axminster backing in combination with a loop pile surface comprising pile loops of individually selected heights drawn from pile warps woven into the Axminster backing. As previously noted in connection with Fig. 18, and as more specifically shown in Figs. 2-5 inclusive, the stuffer warps 76, semi-stuffer warps 78 and chain warps 80 are shedded in the normal manner of Axminster weaving, the sheds from these warps being disposed alternately either in a downward or a substantially horizontal position to receive the weft inserting needle 54. The particular Axminster ground fabric weave shown in Figs. 18, 29 and 30 consists of a bottom shot which is produced by the insertion of the needle above the chain warps 78 and beneath all of the remaining warps. Next in sequence is the binder shot, which is produced by an arrangement of the warp shed to cause the weft inserting needle to pass beneath the semi-stuffer warps 80 and over all of the remaining warps. The arrangement of the several warps is such as to cause the binder shot to be beaten up into the fell directly over the bottom shot. The third and last of the three shots inserted in the sequence illustrated to form a row of weaving is the row shot. The warps are reshedded to cause the row shot to be inserted over the stuffer warps 76 and semi-stuffer warps 80, and under chain warps 78.

It will be understood that the invention is not limited to the specific form of Axminster weave shown, and that other well known and available weaves for an Axminster loom may be employed. It will be understood also that the invention in its broader aspects is not limited to an Axminster construction and that many of the advantages of applicant's invention may be obtained by the use of a hook bar or bars operating substantially in the manner described in a loom in which the weft is inserted by means of a shuttle.

Novel arrangements of high, low and intermediate loops produced in accordance with the invention are shown in the examples illustrated in Figs. 29 and 30 of the drawings. Referring to Fig. 29, a diamond pattern is produced in which the central portion of the diamond, designated at 330, is raised and the loops are gradually diminished in height toward the edges of the diamond to produce a rounded effect. With this pattern a knob or bud of high loops, designated at 332, is provided at each corner of the diamond. A line of demarcation 334 is produced between the edges of adjacent diamonds by means of outs in which no loops at all are drawn. The loop construction and arrangement shown in the right hand portion of Fig. 29 illustrates the use of very low loops 336 as a fabric ground with adjacent thereto, groups of high loops which are pyramided to produce strongly marked ridges 338. It will be noted that the heights of the individual loops, both weftwise and warpwise of the fabric, are arbitrarily selected to produce the desired pattern effect.

The design illustrated in the left hand portion of Fig. 30 shows a sharply etched pattern in which configuration is obtained by utilizing a border of very high loops as at 340, adjacent a fabric ground produced by very low loops. In this instance the ground portion is bordered on both sides by loops which may be of maximum height, and it will be noted that the design is in the form of a curve which can be produced only by an arbitrary selection of high, low and intermediate loops, both lengthwise and widthwise of the fabric. In this pattern a simulation of a leaf is produced in which the central portion of the leaf is a valley formed by low loops separated into two groups by outs to form the spine 342 of the leaf. At each side of the spine the loops are of gradually increasing height until the sharply contoured outer edge 344 of the leaf is reached which again is formed of extreme high loops having adjacent thereto the very low loops of the adjacent fabric ground.

The design illustrated on the right side of Fig. 30 consists of squares 348 of high loops set in diagonal relation to squares 350 formed of low loops. The edges of the squares are sharply marked since no gradation is required between the groups of the high loops and groups of low loops either warpwise or weftwise of the fabric. It will be further noted that a somewhat rough pebbly surface effect in each of the squares is obtained by introducing slight variations in the heights of the individual loops in each of the high and low groups.

Features of the present invention which relate particularly to the product produced in accordance with applicant's invention have been made the subject matter of a divisional application for Letters Patent in the United States, Serial No. 434,209, filed June 3, 1954, for Manufacture of Carpets.

The invention having been described what is claimed is:

1. The method of weaving a carpet having a raised warp pile surface which comprises the steps of shedding ground warps and pile warps at a different level from the ground warps, inserting wefts into the successively formed sheds and beating the wefts into the fell in accordance with a predetermined sequence of shedding to produce successive rows of weaving, and manipulating in substantially vertical directions and oscillating a hook bar assembly comprising a bar having hooks individually positioned and supported in said bar to engage and raise loops of said pile warps of different selected heights to be beaten into the fell, and changing the hook bar assembly after a selected row of weaving to provide a different selection of bar supported hook lengths to produce different loop height selections for a successive row of weaving in accordance with a pattern.

2. The method of weaving a carpet having a raised warp pile surface which comprises the steps of shedding ground warps and pile warps at a different level from the ground warps, inserting wefts into the successively formed sheds and beating the wefts into the fell in accordance with a predetermined sequence of shedding to produce successive rows of weaving, and manipulating in a predetermined manner a hook bar having hooks individually positioned at selected heights and supported in said bar to engage and raise loops of said pile warps of different selected heights to be beaten into the fell, utilizing for following rows of weaving a series of hook bars each with hooks supported on said bar in varying positions to raise pile loops of different selected heights in accordance with a pattern.

3. The method of weaving a carpet having a raised warp pile surface which comprises the steps of shedding ground warps and pile warps at a different level from the ground warps, inserting wefts into the fell in accordance with a predetermined sequence of shedding to produce successive rows of weaving, and manipulating a hook bar in a fixed path including movements in substantially vertical directions and oscillating movements to engage and raise loops of said pile warps to be beaten into the fell and to disengage the hooks from the raised loops, and in the weaving of each successive row controlling the position of each hook in the bar and thereby to control the height of each loop in accordance with a pattern.

4. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a hook bar assembly including a series of hooks disposed with relation to one another to engage said pile warps and to raise pile loops of different selected heights, and supporting means on which hooks are disposed in fixed relation to one another, and means operable for each successive row of weaving for conditioning said hook bar assembly to provide a different hook disposition for raising rows of loops of different selected heights.

5. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops of different controlled heights from said pile warps in successive rows of weaving which comprises a hook bar assembly including a series of hooks disposed with relation to one another in said assembly to raise loops of different selected heights from said pile warps, and supporting means on which the hooks are disposed in fixed relation to one another, means for moving said hook bar assembly in a pile loop raising cycle to raise a row of loops for each successive row of weaving, and means operable for each successive weaving row producing sequence for conditioning said hook bar assembly to provide a different disposition of hooks in said assembly for raising rows of pile loops of different selected heights.

6. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops of different controlled heights from said pile warps in sucessive rows of weaving which comprises a hook bar assembly arranged to provide for each successive row of weaving a hook bar, and a series of hooks disposed with relation to one another on the hook bar to raise loops of different selected heights from said pile warps, means for moving said hook bar assembly in substantially vertical and in oscillatory directions in a pile loop raising cycle to raise a row of loops for each successive row of weaving, and a pattern control means constructed and arranged to condition said hook bar assembly for each successive row of weaving to provide different hook dispositions for raising rows of loops of different selected heights, and means operative with each weaving row producing sequence for moving the hook bar assembly with relation to said pattern control means and with relation to the shedded pile warps to raise a row of pile loops of selected heights.

7. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops of different selected heights from said pile warps in successive rows of weaving, which comprises a hook bar assembly arranged to provide for each successive row of weaving a hook bar, and a series of hooks disposed with relation to one another on the hook bar to raise loops of different selected heights from said pile warps, means including a pair of arm supports for moving said hook bar assembly in substantially vertical directions and on which the hook bar is oscillated in a pile loop raising cycle to raise a row of loops for each successive row of weaving, and a pattern control means constructed and arranged to condition said hook bar assembly for each successive row of weaving to provide different hook dispositions in said assembly for raising rows of loops of different selected heights.

8. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a hook bar assembly including a hook bar, and a series of hooks disposed with relation to one another on the hook bar to raise pile loops of different selected heights, means for moving said hook bar assembly in a pile loop raising cycle to raise a row of pile loops for each successive row of weaving, and a pattern control means for condtioning said hook bar assembly to provide different hook dispositions in said assembly for raising rows of loops of different selected heights comprising a plurality of hook bars each having a series of hooks disposed thereon to draw pile loops of different selected heights, and means for substituting one of said plurality of hook bars for another in said hook bar assembly for successive pile loop raising cycles.

9. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a hook bar assembly including a hook bar, and a series of hooks disposed with relation to one another on the hook bar to raise pile loops of different selected heights, means for moving said hook bar assembly in a pile loop raising cycle to raise a row of pile loops for each successive row of weaving, and a pattern control means for conditioning said hook bar assembly to provide different hook dispositions in said assembly for raising rows of loops of different selected heights comprising a plurality of hook bars each having a series of hooks disposed thereon to draw pile loops of different selected heights, a carrier device for said plurality of hook bars, and means for relatively moving said carrier device and hook bar assembly moving means to substitute one of said plurality of hook bars for another in said hook bar assembly for successive pile loop raising cycles.

10. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a hook bar assembly including a hook bar, and a series of hooks disposed with relation to one another on the hook bar to raise pile loops of different selected heights, means for moving said hook bar assembly in a pile loop raising cycle to raise a row of pile loops for each successive row of weaving comprising a pair of support arms on which the hook bar is removably supported, and a pattern control means for conditioning the hook bar assembly to provide different hook dispositions in said assembly for raising rows of loops of different selected heights comprising a plurality of hook bars each having a series of hooks disposed thereon to draw pile loops of different selected heights, and a carrier device on which said hook bars are moved successively to a loading and unloading station, and means for moving said support arms to take from the carrier and to move each of said plurality of hook bars successively in a pile loop raising cycle.

11. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a series of hook bars, in each hook bar a series of hook members at different selected vertical positions to engage with and raise pile loops of correspondingly different heights, an endless movable carrier device on which said hook bars are moved successively to a pattern control station, and a hook bar operating device including hook bar support arms operable in accordance with a pattern control and loop raising cycle to engage a hook bar on said arms at said pattern control station and to move said bar with relation to the shedded pile warps to engage and raise loops from said pile warps of different heights corresponding with the positioned heights of said hook members, and thereafter to return said hook bar to said pattern control station.

12. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a series of hook bars, in each bar a series of hook members at different selected vertical positions to engage with and raise pile loops of correspondingly different heights, a carrier device on which said hook bars are moved successively to a pattern control station, a hook bar operating device including a hook bar support operable in accordance with a pattern control and loop raising cycle to engage a hook bar at said pattern control station and to move said bar with relation to the shedded pile warps to engage and lift a row of pile loops of different heights corresponding to the positioned heights of said hook members, and actuating means operable with successive rows of weaving for advancing successive hook bars to said pattern control station and for moving said support in accordance with said pattern control and loop raising cycle.

13. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising loops from said pile warps which comprises a hook bar, a series of hook members individually adjustable on said bar to raise pile loops of correspondingly adjusted heights, supporting means on which the bar is moved in substantially vertical and in oscillatory directions in a pile loop raising and casting-off cycle, actuating means for the hook bar, and pattern means operative to adjust said hook members to produce rows of pile loops of different selected heights.

14. In a loom for weaving pile fabrics having weaving devices including harness means, weft thread inserting means, a reciprocating lay, and means controlling said harness means operable for shedding ground warps and pile warps in accordance with a predetermined sequence to produce successive rows of weaving, the combination of a mechanism for raising loops from said pile warps which comprises a hook bar, a series of hook members individually adjustable on said bar to raise pile loops of correspondingly adjusted heights, supporting means on which the bar is moved in substantially vertical and in oscillatory directions in a pile loop raising and casting-off cycle with each successive row of weaving, and pattern means operative to adjust said hook members for each successive loop raising and casting-off cycle of said hook bar to produce rows of pile loops of different selected heights.

15. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising loops from said pile warps which comprises a hook bar, a series of hook members individually adjustable on said bar to raise pile loops of correspondingly adjusted heights, pattern means arranged to cooperate with said hook bar to adjust the hook members to produce rows of pile loops of different selected heights, supporting means on which the hook bar is moved in accordance with a pattern adjustment and pile loop raising cycle including movements in substantially vertical and oscillatory directions into cooperative relation with the pattern means and to raise and to cast-off loops of said pile warps, and actuating means for moving the hook bar in accordance with said pattern adjustment and pile loop raising cycle.

16. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a series of hook members slidably supported in the hook bar for adjustment to raise loops of different selected heights, each hook member having in the upper end thereof a series of different length pattern control fingers, pattern means having cards successively positioned to cooperate with the hook bar and perforated to cooperate with said fingers to adjust the hook members, supporting means on which the hook bar is moved in accordance with a pattern adjustment and pile loop raising cycle including movements in substantially vertical and oscillatory directions into cooperative relation with a pattern card to adjust the hook members, and thereafter into cooperative relation with the shedded pile warps to produce a row of pile loops of selected heights, and actuating means for moving the hook bar in accordance with said pattern adjustment and pile loop raising cycle.

17. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a series of hook members slidably supported in the hook bar for adjustment to raise loops of different selected heights, each hook member having in the upper end thereof a series of different length pattern control fingers, pattern means including a carrier and cards supported thereon successively positioned to cooperate with the hook bar and perforated to cooperate with said fingers to adjust the hook members, pivoted supported means on which the hook bar is moved in accordance with a pattern adjustment and pile loop raising cycle into cooperative relation with a pattern card to adjust the hook members, and thereafter into cooperative relation with the shedded pile warps to produce a row of pile loops of selected heights, and actuating means operative with each successive row of weaving to condition said pattern means and to move the hook bar in substantially vertical and oscillatory directions in accordance with said pattern adjustment and pile loop raising cycle.

18. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising pile warps which comprises a hook bar, a series of hook members movably supported in the hook bar and arranged to be moved to individually adjusted extended positions to raise pile loops of correspondingly adjusted heights, a control jack member associated with each hook member movably supported on the hook bar for movement between retracted and adjusted extended positions, and constructed and arranged to control the extension of said hook members, yieldable means tending to retract each of said hook and jack members, separately operable locking devices for securing the hook members and jack members fixedly to the hook bar, pattern means arranged to cooperate with the hook bar for adjusting the jack members and hook members controlled thereby to produce rows of pile loops of different selected heights, supporting means on which the hook bar is moved in substantially vertical and oscillatory directions in accordance with a pattern adjustment and pile loop raising cycle into cooperative relation with the pattern means and to raise and to cast off loops of said pile warps, and means operative during said movement of the hook bar for controlling the respective locking devices to engage and to release the respective hook members and jack members.

19. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising loops from said pile warps which comprises a hook bar, a series of hook members movably supported in the bar and arranged to be moved to individually adjusted positions to raise pile loops of correspondingly adjusted heights, a control jack member associated with each hook for movement on the hook bar between retracted and adjusted extended positions and constructed and arranged to control the extension of said hook members, supporting means on which the bar is moved in a pile loop raising and pile loop casting-off cycle in directions including substantially vertical and oscillatory directions, actuating means for the hook bar, and pattern means operative to adjust said control jack members and thereby to cause the hook members controlled by said jack members to draw pile loops of correspondingly adjusted heights.

20. In a loom for weaving pile fabrics having weaving devices including harness means, weft inserting means, a reciprocating lay, and means controlling said harness means operable for shedding ground warps and pile warps in accordance with a predetermined sequence to produce successive rows of weaving, the combination of a mechanism for raising loops from said pile warps which comprises a hook bar, a series of hook members movably supported in the hook bar and arranged to be moved to individually adjustable extended positions to raise pile loops of correspondingly adjusted heights, a control jack member associated with each hook member for movement on the hook bar between retracted and extended adjusted positions and constructed and arranged to control the extension of said hook members, separately operable locking devices for securing the hook members and jack members fixedly to the hook bar, pattern means arranged to cooperate with the hook bar for moving selected hook members to loop taking positions and for adjusting said jack members and thereafter conditioning the hook members to produce pile loops of different selected heights, supporting means on which the hook bar is moved in substantially vertical and oscillatory directions in accordance with a pattern adjustment and pile loop raising cycle into cooperative relation with the pattern means, and to raise and to cast off loops of said pile loops, means cooperating with said pattern means to release said locking devices and thereafter to lock said jack members and hook members in said positions, and control means operable during the loop drawing cycle to release said hook members and thereafter to lock said hook members in the extended positions.

21. A hook bar for raising pile loops in a loom having weaving devices for shedding ground warps and pile warps, which comprises a hook bar movable in substantially vertical and oscillatory directions in accordance with a pile loop raising cycle, a series of hook members movably supported in the bar for movement between retracted and individually adjustable extended positions to raise pile loops of correspondingly adjusted heights, means for retracting the hook members in the bar, control means operable to control the extent of movement of the hook members to individually adjusted extended loop raising positions, and a locking device acting when rendered operative to lock all of said members in position on the bar.

22. A hook bar for raising pile loops in a loom having weaving devices for shedding ground warps and pile warps, which comprises a hook bar movable in substantially vertical and oscillatory directions in accordance with a pile loop raising cycle, a series of hook members movably supported in the bar for movement between retracted and individually adjustable extended positions to raise pile loops of correspondingly adjusted heights, yieldable means for retracting each hook member, control means operable to control the movement of the hook members to individually adjusted extended loop raising positions, and a locking device shiftable between locking and release positions arranged in the locking position to secure all of said members fixedly in the hook bar.

23. A hook bar movable in directions which include substantially vertical and oscillatory directions for raising pile loops in a loom having weaving devices for shedding ground warps and pile warps, which comprises a hook bar having transversely slotted front and rear interior walls, a series of flat hook members having the side edges thereof slidably engaged in said slots and arranged to move between retracted and individually adjusted extended positions to raise pile loops of correspondingly adjusted heights, spring means tending to retract each hook member, control means operable to control the movement of the hook members to individually adjusted extended loop raising positions, a locking device operable to secure said members in their slots rigidly to the hook bar, and a control device for rendering said locking device operative and inoperative.

24. A hook bar movable in directions which include substantially vertical and oscillatory directions for raising pile loops in a loom having weaving devices for shedding ground warps and pile warps, which comprises a hook bar, a series of hook members movably supported in the bar and arranged to be projected to individually adjusted positions thereon, spring means tending to retract each hook member, pattern fingers on each of said hook members by means of which said hook members are projected to individually adjusted positions on the hook bar, and a locking device acting when rendered operative to lock each of said hook members in position on the bar.

25. A hook bar movable in directions which include substantially vertical and oscillatory directions for raising pile loops in a loom having weaving devices for shedding ground warps and pile warps which comprises a hook bar, a series of flat hook members slidably supported in the bar and arranged to be projected outwardly to individually adjusted positions, each said hook member having a serrated edge, spring means tending to retract each hook member, pattern fingers on each of said hook members by means of which said hook members are projected to individually adjusted positions on the hook bar, and a locking device comprising a locking bar, and means actuating when rendered operative to move said locking bar into engagement with the serrations in said hook members to lock said hook members in position on the hook bar.

26. A hook bar movable in directions which include substantially vertical and oscillatory directions for raising pile loops in a loom having weaving devices for shedding ground warps and pile warps, which comprises a series of hook members movably supported on the bar and arranged to be projected to individually adjusted positions, said hook members having selector fingers for advancing hook members to a loop forming position on the hook bar, a control jack member associated with each hook member for movement in parallel relation thereto, and having a stop surface arranged to limit the projecting movement of the associated hook member, said jacks having pattern control fingers for projecting the jacks to selected hook adjusting positions, yieldable means for retracting each of said hook and jack members, a locking device operable to lock and to release the several jacks in adjusted positions, a jack locking device for locking the several jack members in adjusted position, and means controlling each of said locking devices.

27. A hook bar movable in directions which include substantially vertical and oscillatory directions for raising pile loops in a loom having weaving devices for shedding ground warps and pile warps, which comprises a hook bar, a series of hook members slidably supported in the bar and arranged to be projected outwardly thereon to individually adjusted positions, a control jack member associated with each hook member and arranged to limit the projecting movement of the hook member, spring means tending to retract each of said hook and jack members, pattern control fingers on each of said hook and jack members, a locking device for locking the hook members in adjusted positions, a separate locking device for locking each of said jack members in adjusted position on the bar, and control means for rendering each of said locking means operative and inoperative.

28. A hook bar movable in directions which include substantially vertical and oscillatory directions for raising pile loops in a loom having weaving devices for shedding ground warps and pile warps which comprises a hook bar, a series of flat hook members slidably supported in the bar to be projected outwardly thereon, a flat control jack member associated with each hook member and slidable in parallel relation to the hook member on the bar, and having a stop surface arranged to limit the projecting movement of the associated hook member, spring means tending to retract each of said hook and jack members, a locking device for locking the hook members in position which comprises serrations on the edges of the hook members, a hook locking bar arranged to engage said serrations, and means moving said hook locking bar into and out of locking position, a separate locking device for locking each of said jack members in position which comprises serrations on each of said jack members, and a jack locking bar movable into and out of locking engagement with said serrated edges and means moving said jack locking bar into and out of locking position.

29. In a loom for weaving pile fabrics having weaving devices including harness means, weft thread inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a hook bar, a series of flat hook members supported in the hook bar with the flat portions in parallel relation to engage between adjacent pile warps, each hook member having one side thereof formed with an offset pile warp engaging hook, said hooks being disposed from the hook bar on said hook members at different selected lengths to engage with and raise pile loops of correspondingly different selected heights, and a hook bar operating device including a pair of support arms movable with the hook bar toward and away from the pile warps and longitudinally of the hook bar, a pivotal support for the hook bar on said arms, and actuating means for moving said arms toward and away from the shedded pile warps and in a direction longitudinal of the hook bar to engage the pile warp on the hooks, and means imparting rotational movements to the hook bar about the pivotal support of said arms to disengage the raised loops therefrom.

30. In a loom for weaving pile fabrics having weaving devices including harness means, weft thread inserting means, a reciprocating lay, and means controlling said harness means operable for shedding ground warps and pile warps in accordance with a predetermined sequence to produce successive rows of weaving, the combination of a mechanism for raising pile loops from said pile warps in successive rows of weaving, which comprises a hook bar, a series of flat hook members supported on the hook bar with the flat surfaces thereof in parallel relation for engagement between adjacent pile warps, each of said hook members having formed on one face thereof an offset hook disposed a selected length from the hook bar lengthwise of said face to engage with and raise a pile loop of selected height, a carrier on which the hook bar is supported and moved therewith to engage the hook members between and to withdraw the hook members from between the pile warps and laterally to engage said pile warps in the hooks, and means for rocking the hook bar with relation to said carrier means to disengage the raised loops from the hooks.

31. In a loom for weaving pile fabrics having weaving devices including harness means, weft thread inserting means, a reciprocating lay, and means controlling said harness means operable for shedding ground warps and pile warps in accordance with a predetermined sequence to produce successive rows of weaving, the combination of a mechanism for raising loops from said pile warps in successive rows of weaving, which comprises a hook bar, a series of flat hook members disposed with the flat surfaces thereof in parallel relation on the hook bar for engagement between adjacent pile warps, each said hook being located a selected length from the hook bar on said surface to draw loops of selected height and having its opening and face upwardly and toward the front of the loom to facilitate casting-off of the loop, said hook member being further formed having a tip portion thereof bevelled, a carrier on which the hook bar is supported and moved therewith to engage the hook members between and to withdraw the hook members from between the pile warps and laterally to engage said pile warps in the hooks, and means for rocking the hook bar rearwardly with relation to said carrier means to disengage the raised loops from the hooks.

32. In a loom for weaving pile fabrics having weaving devices including harness means for shedding ground warps and pile warps, means for inserting weft threads into the sheds, and a reciprocating lay, the combination of a hook bar disposed weftwise of the loom and having a series of hooks at different selected vertical positions each adapted to engage and lift a pile warp to form a loop of a corresponding height, and fastening means for securing each selected hook in fixed position on the bar.

33. For use in a loom for weaving pile fabrics having weaving devices including harness means for shedding ground warps and pile warps, means for inserting weft threads into successively formed sheds, and a reciprocating lay, a hook bar arranged to be disposed weftwise of the loom and having mounted therein a selected series of flat hook members disposed with the flat faces thereof in parallel relation, each of said hook members having formed on one face thereof a hook offset from the plane of said face, the location of said hook on said face being selected to cause said hook to engage with and raise a pile loop of a correspondingly selected height, and fastening means for securing each selected hook in fixed position on the bar.

34. In a loom for weaving pile fabrics having weaving devices including harness means for shedding ground warps and pile warps, and weft thread inserting means, the combination therewith of a reciprocating lay which comprises a reed with equally spaced blades throughout its length, said blades having lower portions thereof extending from the beating up level downwardly for guiding the shedded ground warps, and upper portions thereof offset rearwardly and above the beating up level for guiding the shedded pile warps, and a mechanism for raising loops from said pile warps which comprises a hook bar, and means for operating said bar to engage and to raise loops from said pile warps while disposed substantially over said offset for the beating up position of the lay.

35. In a loom for weaving pile fabrics the combination of weaving devices including harness means, weft thread inserting means, a reciprocating lay including a reed with equally spaced blades throughout its length, said blades having lower portions thereof extending from the beating up level downwardly for guiding the shedded ground warps, and upper portions thereof offset rearwardly and above the beating up level for guiding the shedded pile warps, and means controlling said harness means operable for shedding ground warps and pile warps in accordance with a predetermined sequence to produce successive rows of weaving, and a hook bar having a series of hook members to draw loops of said pile warps to selected heights, a support on which the hook bar is moved over the offset to engage and raise loops from said shedded pile warps.

36. In a loom for weaving pile fabrics the combination of weaving devices including harness means, weft thread inserting means, a reciprocating lay including a reed with equally spaced blades throughout its length, said blades having lower portions thereof extending from the beating up level downwardly for guiding the shedded ground warps, and upper portions thereof offset rearwardly and above the beating up level for guiding the shedded pile warps, a hook bar having a series of hook members to draw loops of said pile warps to selected heights, a pair of arms pivoted rearwardly of the lay on the machine on which the hook bar is rotatably supported for movements with the arms toward and away from the shedded pile warps to raise loops and for rotational movement relative to the arms to cast off loops from the hooks, and actuating means for imparting forward and back rocking movements to the arms and hook bar.

37. In a loom for weaving pile fabrics having weaving devices including harness means for shedding ground warps and pile warps, and means for inserting weft threads into the sheds, the combination of a reciprocating lay comprising a reed with equally spaced blades throughout its length, said blades having lower portions thereof extending from the beating up level downwardly for guiding the shedded ground warps, and upper portions thereof offset rearwardly and above the beating up level for guiding the shedded pile warps, a pair of arms supported from the machine rearwardly of the lay on which a hook bar having hooks thereon is rotatably supported for movement with the arms toward and away from portions of said pile warps disposed above the offset and for movement with the arms in a direction longitudinal of the bar to engage and draw loops of said pile warps, and for rotational movement relative to the arms to cast off the loops from the hooks, and means for imparting swinging movement to said arms and shifting movements in a direction longitudinal of the hook bar, and additional end means for rocking the hook bar on the arms to draw and to cast off a row of said loops from the hook bar.

38. In apparatus for the manufacture of loop pile fabrics, a rigid horizontal hook bar having affixed to and extending vertically downward from one side thereof at equally spaced intervals, flat, rigid members each of which has a rounded lower extremity and a hook extending angularly upward from one side thereof, the position of some of said hooks on their respective supporting members being higher than others.

39. A method of producing a loop pile fabric including interweaving binder warps and pile warps with wefts, positioning a row of fixed needles having hooked ends, with some of the hooked ends protruding beyond the ends of other needles, between the raised pile warps, manipulating the row of needles to raise the pile warps to form loops of various heights and then manipulating the row of needles to disengage the hooked ends from the loops.

40. A carpet loom including means for interweaving binder warps and pile warps with wefts to produce a pile fabric in combination with a series of needle bars, each bar having a plurality of hooked needles projecting from the bar to varying extents in accordance with a pattern, a carrier chain for said needle bars, a transfer mechanism including clutches for engaging the ends of said needle bars and releasing them from said carrier chain, means for moving the clutches to convey said needle bars to a position for engaging the needles with the pile warps for raising portions of the warps to form loops and means for swinging said clutches forward and backward to engage and disengage the hooked ends of the needles with and from the pile warps.

41. A carpet loom including means for interweaving binder warps and pile warps with wefts to produce a pile fabric in combination with a plurality of needle bars, each bar having a plurality of hooked needles projecting from the bar to varying extents in accordance with a pattern, a transfer mechanism including clutches for gripping and conveying said needle bars to position the needles in engaging position with the pile warps and means for oscillating said clutches to move the needle bars to engage and disengage the hooked ends of the needles with and from the pile warps.

42. A method of producing a loop pile fabric including interweaving binder warps and pile warps with wefts, successively transferring a plurality of needle bars, each bar having a series of hooked needles with some of the needles protruding from the bar to a greater extent than others, to position the needles between the raised pile warps, manipulating the bars to engage the needles with the pile warps and raise portions to form loops of various heights and then manipulating the bars to disengage the needles from the loops.

43. A carpet loom including means for interweaving binder warps and pile warps with wefts to produce a pile fabric, in combination with a needle bar having a row of hooked needles depending from said bar to varying extents, a support for said needle bar reciprocating in substantially vertical directions movable to position the needles between the pile warps and means for oscillating said needle bar to dispose the needles in hook engaging relation to the pile warps and raise portions of the pile warps to form a weftwise row of loops of different heights.

44. A carpet loom as described in claim 43 wherein said reciprocating support and said oscillating means are operable to move said needle bar to disengage the hooked needles from the loops.

45. A carpet loom including means for interweaving binder warps and pile warps with wefts to produce a pile fabric, in combination with a plurality of independent needle bars, each bar having a plurality of hooked needles projecting from the bar to varying extents in accordance with a pattern, means reciprocating in substantially vertical directions for successively moving said needle bars to position the needles between the pile warps and means for oscillating said needle bars to dispose the needles in hook engaging relation to the pile warps and raise portions of the pile warps to form weftwise rows of loops of different heights.

46. A carpet loom as described in claim 45 wherein said vertical reciprocating means and said oscillating means are operable to move said needle bars to disengage the hooked needles from said loops.

References Cited in the file of this patent

UNITED STATES PATENTS

| | | |
|---|---|---|
| 1,799,226 | Gilhet | Apr. 7, 1931 |
| 2,381,028 | Bartholomew | Aug. 7, 1945 |
| 2,430,559 | Dacey | Nov. 11, 1947 |
| 2,573,841 | Groat | Nov. 6, 1951 |
| 2,574,108 | Kahn | Nov. 6, 1951 |
| 2,576,791 | Jackson | Nov. 27, 1951 |
| 2,609,004 | St. Jean et al. | Sept. 2, 1952 |
| 2,610,652 | Parker | Sept. 16, 1952 |
| 2,638,934 | Parker | May 19, 1953 |

FOREIGN PATENTS

| | | |
|---|---|---|
| 273,409 | Great Britain | July 6, 1927 |

U. S. DEPARTMENT OF COMMERCE
PATENT OFFICE

CERTIFICATE OF CORRECTION

Patent No. 2,834,806     Harry F. Jamrogowicz     May 13, 1958

It is hereby certified that error appears in the printed specification of the above numbered patent requiring correction and that the said Letters Patent should read as corrected below.

Column 15, lines 41 and 42, for "alternately" read --alternatively--; column 14, lines 55, 59, 60 and 62, for "wraps", each occurrence, read --warps--.

Signed and sealed this 1st day of July 1958.

(SEAL)
Attest:
KARL H. AXLINE
Attesting Officer

ROBERT C. WATSON
Commissioner of Patents